(12) United States Patent
Okae et al.

(10) Patent No.: US 10,629,912 B2
(45) Date of Patent: Apr. 21, 2020

(54) ELECTRODE AND BATTERY

(71) Applicant: Murata Manufacturing Co., Ltd., Kyoto (JP)

(72) Inventors: Izaya Okae, Fukushima (JP); Eishi Endo, Tokyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 71 days.

(21) Appl. No.: 15/035,048

(22) PCT Filed: Oct. 30, 2014

(86) PCT No.: PCT/JP2014/005509
§ 371 (c)(1),
(2) Date: May 6, 2016

(87) PCT Pub. No.: WO2015/079624
PCT Pub. Date: Jun. 4, 2015

(65) Prior Publication Data
US 2016/0293957 A1     Oct. 6, 2016

(30) Foreign Application Priority Data

Nov. 29, 2013 (JP) .................. 2013-248517

(51) Int. Cl.
*H01M 4/62* (2006.01)
*H01M 10/0565* (2010.01)
*H01M 4/13* (2010.01)
*H01M 10/0525* (2010.01)
*H01M 10/42* (2006.01)
*H01M 10/0566* (2010.01)
*H01M 10/052* (2010.01)

(52) U.S. Cl.
CPC .............. *H01M 4/62* (2013.01); *H01M 4/13* (2013.01); *H01M 10/0525* (2013.01); *H01M 10/0565* (2013.01); *H01M 10/052* (2013.01); *H01M 10/0566* (2013.01); *H01M 10/4235* (2013.01)

(58) Field of Classification Search
None
See application file for complete search history.

(56) References Cited

U.S. PATENT DOCUMENTS

| | | | |
|---|---|---|---|
| 2002/0006552 A1* | 1/2002 | Ishida | H01M 4/13 429/303 |
| 2008/0241705 A1* | 10/2008 | Wakita | H01M 4/0404 429/344 |
| 2010/0055564 A1* | 3/2010 | Tokunaga | H01M 4/0404 429/209 |

(Continued)

FOREIGN PATENT DOCUMENTS

| | | |
|---|---|---|
| JP | 10-255807 A | 9/1998 |
| JP | 2001-307735 A | 11/2001 |
| JP | 2007-305546 A | 11/2007 |

(Continued)

Primary Examiner — Christopher P Domone
(74) Attorney, Agent, or Firm — Chip Law Group

(57) ABSTRACT

A battery includes a positive electrode, a negative electrode, and an electrolyte. At least one of the positive electrode and the negative electrode is an electrode containing an active material and an inorganic oxide. The inorganic oxide is in a state of being extractable with tetrahydrofuran or methyl ethyl ketone at normal temperature.

15 Claims, 8 Drawing Sheets

(56) References Cited

U.S. PATENT DOCUMENTS

| | | | | |
|---|---|---|---|---|
| 2013/0071741 A1* | 3/2013 | Ohara et al. | .......... | H01M 4/133 |
| 2015/0044550 A1* | 2/2015 | Park | ..................... | H01M 4/622 |
| | | | | 427/122 |

FOREIGN PATENT DOCUMENTS

| | | | |
|---|---|---|---|
| JP | 2008-041465 | A | 2/2008 |
| JP | 2008-041502 | A | 2/2008 |
| JP | 2008-218385 | A | 9/2008 |
| JP | 2009-043536 | A | 2/2009 |
| JP | 2009-200043 | A | 9/2009 |
| JP | 2011-100663 | A | 5/2011 |
| JP | 2012-182012 | A | 9/2012 |
| JP | 5140822 | B | 2/2013 |
| WO | 2010/143677 | A | 12/2010 |
| WO | WO2011152263 | * | 12/2011 |

* cited by examiner

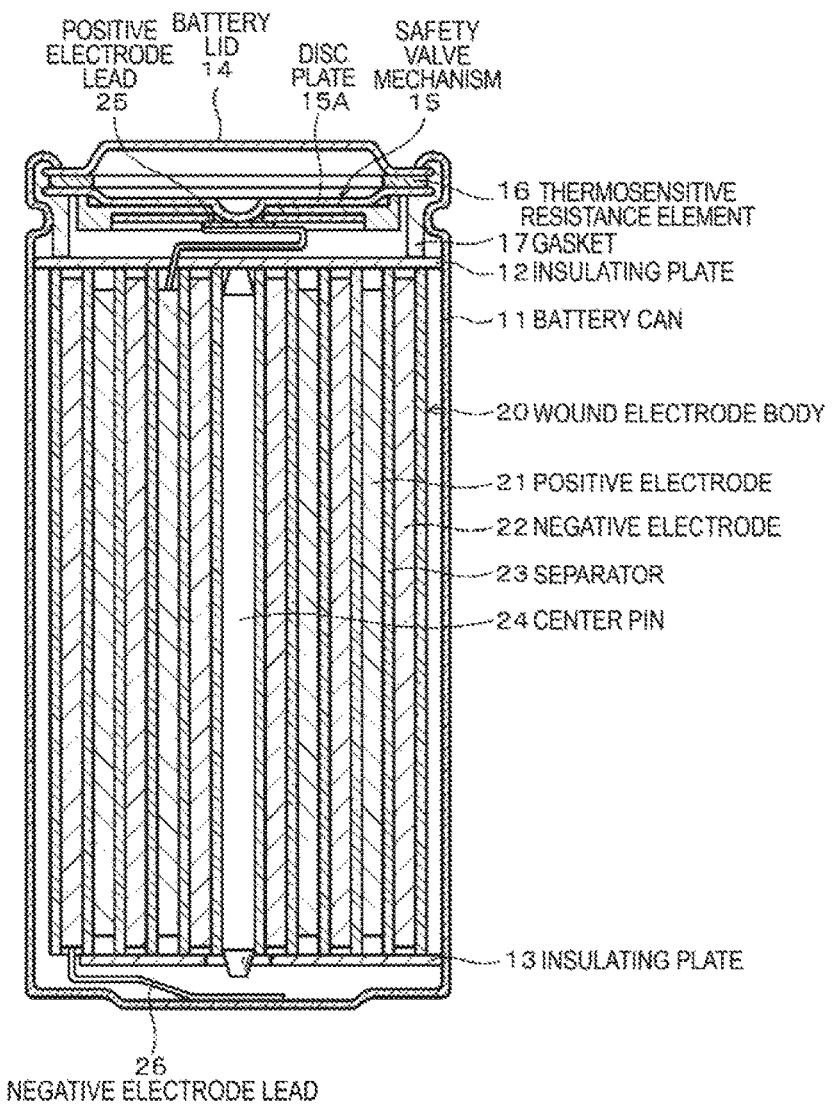
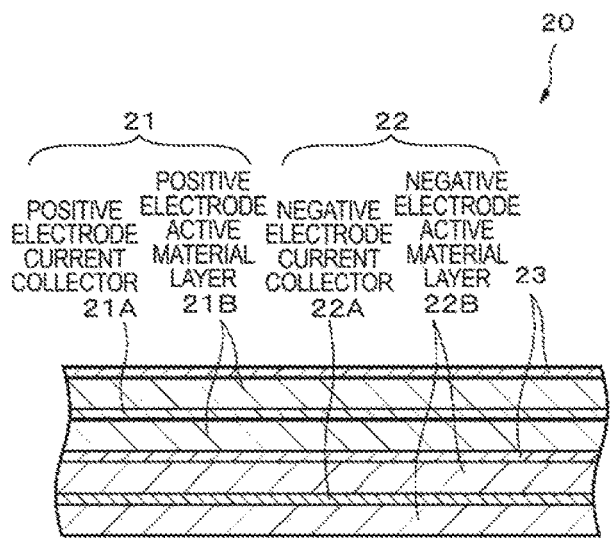

ELECTRODE AND BATTERY

CROSS REFERENCE TO RELATED APPLICATIONS

This application is a U.S. National Phase of International Patent Application No. PCT/JP2014/005509 filed on Oct. 30, 2014, which claims priority benefit of Japanese Patent Application No. JP 2013-248517 filed in the Japan Patent Office on Nov. 29, 2013. Each of the above-referenced applications is hereby incorporated herein by reference in its entirety.

TECHNICAL FIELD

The present technology relates to an electrode containing an inorganic oxide and a battery including the electrode.

BACKGROUND ART

A lithium ion secondary battery including a positive electrode and a negative electrode that occlude and release lithium (Li) and a non-aqueous electrolyte has a high voltage and a high energy density. Hence, the lithium ion secondary battery is drawing attention these days as a power source of mobile phones, notebook personal computers, electric tools, electric automobiles, etc. However, in order to use the lithium ion secondary battery as power sources of wide-ranging applications, further improvement in energy density and higher input characteristics than existing ones are desired. The improvement in input characteristics is important not only to improve user's convenience but also to suppress the increase in the weight and size of the battery.

In the lithium ion secondary battery, the upper limit of the charging rate is influenced by the charging acceptability of the negative electrode, and the charging acceptability is greatly constrained not only by the performance of the negative electrode active material but also by the ion conductivity of the electrolyte. For example, when the non-aqueous electrolyte of the lithium ion secondary battery and an aqueous electrolyte of a nickel-metal hydride battery are compared, the ionic conductivity of the former is approximately one to two orders lower than the ionic conductivity of the latter. The difference in ion conductivity appears in differences in electrode thickness and charging rate between the lithium ion secondary battery and the nickel-metal hydride battery.

For the ion conductivity of the electrolyte, not only the ion conductivity of a separator layer (or an electrolyte layer) between the positive and negative electrodes but also the ion conductivity in the positive and negative electrodes is important. In the lithium ion secondary battery, when an electrolyte with a low Li ion conductivity is used, the overvoltage in the electrode during charging and discharging will become large, and particularly when the charging rate is high, the electric potential of the negative electrode will become a minus and this will cause deposition of Li metal and a short circuit between the positive and negative electrodes.

To address such a problem, the following technologies are proposed.

In Patent Literature 1, a cation conductive medium in which an inorganic oxide with a specific surface area of 0.3 to 50 $m^2/g$ is put in an ionic liquid to improve the cation conductivity in the ionic liquid is proposed.

In Patent Literature 2, a negative electrode for a non-aqueous electrolyte secondary battery in which a nanoparticle-size ceramic is dispersed in a negative electrode to achieve high input/output density and cycle characteristics is proposed.

CITATION LIST

Patent Literature

Patent Literature 1: JP 5140822B
Patent Literature 2: JP 2008-41465A

SUMMARY OF INVENTION

Technical Problem

However, in the technology of Patent Literature 1, in the actual battery manufacturing process, the inorganic oxide is filtered at an electrode or a separator existing in the liquid introduction path before the cation conductive medium spreads fully to the separator and into the electrode pores. Hence, the improvement in ion conductivity in the positive and negative electrodes tends to be insufficient, and it is difficult to sufficiently improve the charging acceptability.

In the technology of Patent Literature 2, although the improvement in ion conductivity in the electrode can be expected to some extent, it is difficult to obtain a sufficient effect of improvement in charging acceptability.

Thus, an object of the present technology is to provide an electrode that makes it possible to improve the charging acceptability and a battery including the electrode.

Solution to Problem

To solve the problem, first technology resides in a battery including: a positive electrode; a negative electrode; and an electrolyte. At least one of the positive electrode and the negative electrode is an electrode containing an active material and an inorganic oxide. The inorganic oxide is in a state of being extractable with tetrahydrofuran or methyl ethyl ketone at normal temperature.

Second technology resides in an electrode including: an active material; and an inorganic oxide. The inorganic oxide is in a state of being extractable with tetrahydrofuran or methyl ethyl ketone at normal temperature after impregnation with an electrolytic liquid.

In the present technology, after impregnation with the electrolytic liquid, the electrode contains the inorganic oxide in a state where the inorganic oxide is extractable with tetrahydrofuran or methyl ethyl ketone at normal temperature. By fabricating a battery using an electrode in such a state, the inorganic oxide and the electrolyte can be brought into sufficient contact in the electrode, and the ion conductivity in the electrode can be improved.

Advantageous Effects of Invention

As described above, according to the present technology, the charging acceptability can be improved.

BRIEF DESCRIPTION OF DRAWINGS

FIG. 2 is a cross-sectional view showing a configuration example of a non-aqueous electrolyte secondary battery according to a second embodiment of the present technology.

FIG. 3 is an enlarged cross-sectional view of part of the wound electrode body shown in FIG. 2.

DESCRIPTION OF EMBODIMENTS

Embodiments of the present technology will now be described in the following order.
1. First Embodiment (examples of the electrode)
2. Second Embodiment (examples of the cylindrical battery)
3. Third Embodiment (examples of the flat battery)
4. Fourth Embodiment (examples of the electronic device and the battery pack)
5. Fifth Embodiment (examples of the electricity storage system)
6. Sixth Embodiment (examples of the electric vehicle)

1. First Embodiment 1.1 Configuration of the Electrode

Figure 1:
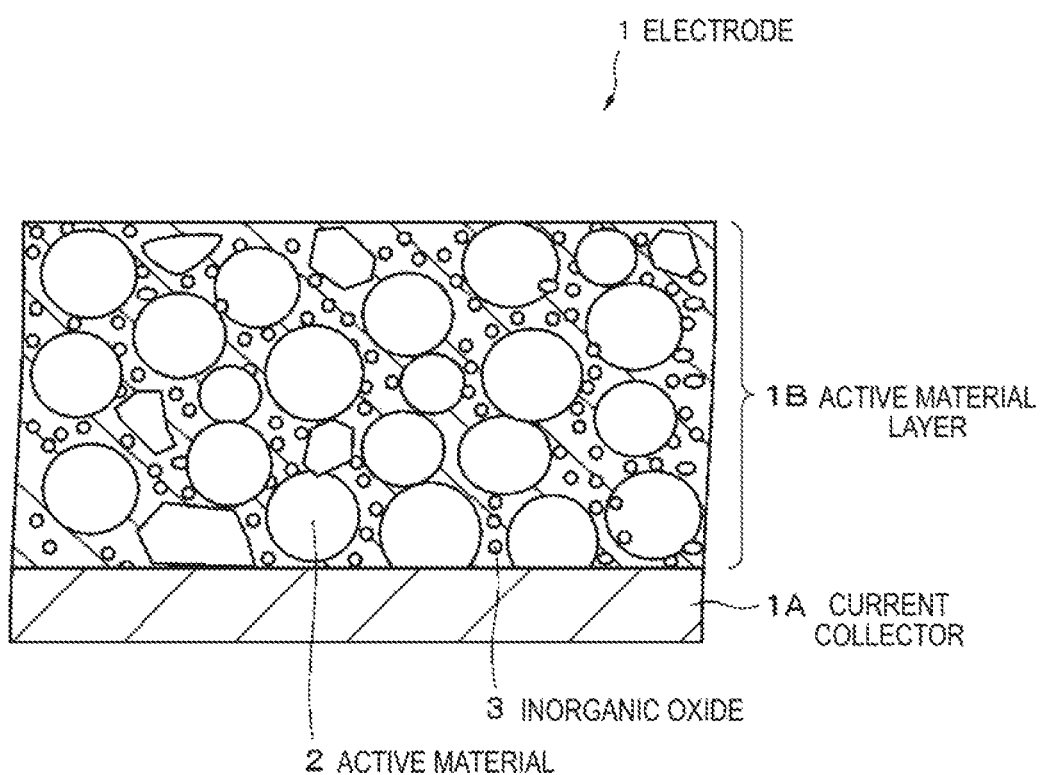
FIG. 1 is a cross-sectional view showing a configuration example of an electrode according to a first embodiment of the present technology.

A configuration example of an electrode according to a first embodiment of the present technology will now be described with reference to FIG. 1. An electrode 1 includes, for example, a current collector 1A and an active material layer 1B provided on both surfaces of the current collector 1A. Although not shown, the active material layer 1B may be provided only on one surface of the current collector 1A.

The electrode 1 is a positive electrode or a negative electrode. The current collector 1A has a band-like shape or a rectangular shape, for example. The active material layer 1B contains one or more kinds of active material 2, an inorganic oxide 3, and a binder that is a resin (not shown). The active material layer 1B may further contain an additive as necessary. As the additive, at least one of an electrically conductive agent, a thickener, etc. may be used. The active material layer 1B includes a plurality of voids such as pores. When a battery is fabricated using the electrode 1, an electrolyte exists in the voids. The electrolyte is an electrolytic liquid or a gel electrolyte, for example.

The inorganic oxide 3 is in a state of being extractable with tetrahydrofuran (THF) or methyl ethyl ketone (MEK) at normal temperature in the active material layer 1B, more specifically in the active material layer 1B impregnated with the electrolyte (an electrolytic liquid or a gel electrolyte). Here, the normal temperature refers to the range of 20° C.±15° C. (more than or equal to 5° C. and less than or equal to 35° C.) provided by Japanese Industrial Standards (JIS) (JIS Z 8703).

Whether the inorganic oxide 3 is in the state mentioned above or not can be assessed by the following sequence or the like. First, the electrolytic liquid in an amount substantially equal to the amount that the active material layer 1B of the electrode 1 absorbs during battery assembly is dropped onto and impregnated into the active material layer 1B. Here, a non-aqueous solvent in which an electrolyte salt is not added may be used in place of the electrolytic liquid. After that, the electrode 1 is loosely wound or folded and is stood in a suitable container, and a lower portion of the electrode 1 (a portion of approximately ⅕ to ½ of the height of the electrode 1) is immersed in an extraction solvent (THF or MEK) and is allowed to stand still for approximately 3 hours to 48 hours. Alternatively, the electrode 1 and the extraction solvent are put in a lidded container, and shaking is performed with a shaker to such a degree that the material of the electrode 1 does not fall off physically. At this time, normal temperature, that is, 20° C.±15° C. provided by Japanese Industrial Standards (JIS) is suitable as the ambient temperature. This is because an excessively increased temperature may cause large swelling or dissolution to occur up to the binder for the original electrode binding (a first binder described later), and an excessively low temperature may cause the extraction to take a long time.

Next, the extraction solvent is recovered, and the amount of the inorganic oxide 3 contained in the extraction solvent is analyzed. When 5 mass % or more of the amount of the inorganic oxide 3 contained in the active material layer 1B, or 0.001 parts by mass or more of the inorganic oxide 3 relative to 100 parts by mass of the active material contained in the active material layer 1B has been found, it is determined that the inorganic oxide 3 is in the state mentioned above.

(Active Material)

The active material 2 contains, for example, one or more electrode materials that can occlude and release lithium, which is an electrode reaction substance. The active material 2 is a positive electrode active material or a negative electrode active material.

(Binder)

The binder (resin) preferably contains a first binder (a first resin) and a second binder (a second resin). The first binder may be either of an aqueous binder and a non-aqueous solvent-based binder. Here, the aqueous binder refers to a binder that dissolves or disperses in water, and the non-aqueous solvent-based binder refers to a binder that dissolves or disperses in a non-aqueous solvent.

The first binder is a general-role binder mainly in charge of the adhesive strength of the electrode 1, and is a binder having low swellability or low solubility to the electrolytic liquid, more specifically to the solvent contained in the electrolytic liquid. As the first binder having such properties, for example, a binder containing at least one selected from the group consisting of poly(vinylidene fluoride) (PVdF), styrene-butadiene copolymer rubber (SBR), poly(acrylic acid) (PAA), and the like may be used. In the case where the electrode 1 is a positive electrode, a binder containing poly(vinylidene fluoride) (PVdF) is preferably used as the first binder. On the other hand, in the case where the electrode 1 is a negative electrode, a binder containing styrene-butadiene copolymer rubber (SBR) or poly(acrylic acid) (PAA) is preferably used as the first binder.

The second binder is a binder that has low crystallinity and has high swellability or high solubility to the electrolytic liquid, more specifically to the solvent contained in the electrolytic liquid. As the binder having such properties, for example, a binder containing a vinylidene fluoride (VdF)-based copolymer may be used. As the VdF-based copolymer, for example, a copolymer with at least one selected from the group consisting of vinylidene fluoride (VdF), hexafluoropropylene (HFP), chlorotrifluoroethylene (CTFE), tetrafluoroethylene (TFE), and the like may be used. More specifically, at least one selected from the group consisting of a PVdF-HFP copolymer, a PVdF-CTFE copolymer, a PVdF-TFE copolymer, a PVdF-HFP-CTFE copolymer, a PVdF-HFP-TFE copolymer, a PVdF-CTFE-TFE copolymer, a PVdF-HFP-CTFE-TFE copolymer, and the like may be used. Also a copolymer of which part of a terminal is modified with a carboxylic acid such as maleic acid may be used as the VdF-based copolymer. In the case where an aqueous binder such as SBR or PAA is used as the first binder, an aqueous VdF-based copolymer is preferably used as the VdF-based copolymer. As the aqueous VdF-based copolymer, for example, a VdF-based copolymer produced by emulsion polymerization is given.

In this specification, a homopolymer containing vinylidene fluoride (VdF) as the monomer is written as "PVdF," and a copolymer containing VdF as one of the monomers is written as a "PVdF-based copolymer."

The second binder preferably contains at least part of the inorganic oxide 3 contained in the active material layer 1B. This is because, when the active material layer 1B is impregnated with the electrolyte, the second binder swells or dissolves to cause the inorganic oxide 3 and the electrolyte to be in sufficient contact in the active material layer 1B, and the ion diffusivity in the electrode 1 is improved. When the second binder is swollen or dissolved due to the electrolyte, the inorganic oxide 3 enters a state of being extractable with THF and MEK at normal temperature.

By the binder containing the second binder, the inorganic oxide 3 can be extracted with a certain solvent, namely THF or MEK, from the interior of the electrode 1 in the state of being impregnated with the electrolyte. Here, the "state of being impregnated with the electrolytic liquid" may be either of a state where the electrode 1 before assembled as a battery is impregnated with the electrolyte in a simulated manner and a state where the electrode 1 assembled as a battery is impregnated with the electrolyte.

The second binder swells largely or dissolves to a solvent commonly used as the electrolytic liquid in the lithium ion secondary battery, such as propylene carbonate (PC), ethylene carbonate (EC), dimethyl carbonate (DMC), or diethyl carbonate (DEC). Therefore, in the battery after assembled, the inorganic oxide 3 contained in the electrode 1 is allowed to be in sufficient contact with the electrolyte.

While the first binder has, after impregnated with the electrolytic liquid, low solubility to THF and MEK at normal temperature, the second binder has, after impregnated with the electrolytic liquid, high solubility to THF and MEK at normal temperature. Therefore, after impregnation with the electrolytic liquid, mainly the inorganic oxide 3 contained in the second binder can be extracted with THF and MEK.

(Inorganic Oxide)

The inorganic oxide 3 is a powder made of inorganic oxide particles. As the shape of the particle, for example, a spherical shape, ellipsoidal shape, needle-like shape, plate-like shape, scale-like shape, tubular shape, wire-like shape, rod-like shape, indefinite shape, etc. may be given; but the shape is not particularly limited to these. Particles of the shapes mentioned above may be used in combination of two or more. The inorganic oxide particle preferably has, on its particle surface, a dispersant having a sulfonic acid group, a carboxylic acid group, or the like.

It is preferable that the electrode 1 contain the second binder with high swellability or high solubility to the electrolyte as described above, and the average particle size (diameter) of the inorganic oxide 3 be smaller than the pore size (diameter) of the active material layer 1B. This is because, in a state where a battery is assembled using the electrode 1, the inorganic oxide 3 and the electrolyte can be brought into contact in a large area in the active material layer 1B. More specifically, the average particle size of the inorganic oxide 3 is preferably 1 µm or less. This is because the pore size of the active material layer of a practical lithium ion secondary battery, in particular the pore size of the negative electrode active material layer, is generally sizes of several micrometers at most. Here, the pore size of the active material layer 1B is found from a pore size distribution measured with a mercury porosimeter. Specifically, when there is one peak in the pore size distribution, the pore size of the active material layer 1B refers to the mode size; and when there is a plurality of peaks in the pore size distribution, the pore size of the active material layer 1B refers to the median size.

In the case where the particle shape of the inorganic oxide 3 is a substantially spherical shape, the average particle size of the inorganic oxide 3 is found by applying the specific surface area found by nitrogen adsorption to the following relation (a relation between the specific surface area and the particle size (diameter) on the assumption that the inorganic oxide is in a spherical shape (a regular sphere)).

$$d=6/(\rho s)$$

(where d: the particle size; $\rho$: the density; s: the specific surface area on the assumption that the inorganic oxide is in a spherical shape)

On the other hand, in the case where the particle shape of the inorganic oxide 3 is not a substantially spherical shape, the average particle size of the inorganic oxide 3 is found with a laser diffraction wet particle size distribution meter (e.g. SALD series of Shimadzu Corporation) or the like. In this case, it is preferable that a suitable dispersion liquid be put in beforehand and large aggregates be sufficiently pulverized with a mortar or the like. Whether the particle shape of the inorganic oxide 3 is a substantially spherical shape or not can be assessed with a transmission electron microscope (TEM) or the like.

The inorganic oxide 3 contains at least one selected from the group consisting of aluminum oxide (alumina, $Al_2O_3$), hydrated aluminum oxide (boehmite, AlOOH), titanium oxide (titania, $TiO_2$), zirconium oxide (zirconia, $ZrO_2$), silicon oxide (silica, $SiO_2$), magnesium oxide (magnesia, MgO), sodium oxide ($Na_2O$), lithium titanate ($Li_4Ti_5O_{12}$), hydrous magnesium silicate (talc, $Mg_3Si_4O_{10}(OH)_2$), and the like.

The amount of the inorganic oxide 3 contained in the active material layer 1B is preferably more than or equal to 0.1 parts by mass and less than or equal to 5 parts by mass relative to 100 parts by mass of the active material. If the amount of the inorganic oxide 3 contained is less than 0.1 mass %, the improvement in ion conductivity by the inorganic oxide 3 tends to be insufficient. On the other hand, if the amount of the inorganic oxide 3 contained is more than 5 parts by mass, the amount of the active material 2 contained is reduced, and the capacity of the battery tends to be reduced.

(Electrically Conductive Agent)

As the electrically conductive agent, for example, carbon materials such as carbon fibers, carbon nanotubes, carbon black, and Ketjenblack are given, and they may be used singly or in mixture of two or more. Furthermore, any material with good electrical conductivity other than carbon materials may be used; for example, a metal material such as Ni powder, an electrically conductive polymer material, or the like may be used.

(Thickener)

As the thickener, sodium carboxymethyl cellulose (CMC) or the like may be used. In particular, when SBR is used as the first binder, a thickener such as CMC is preferably used in combination.

1.2 Method for Manufacturing the Electrode

Next, an example of the method for manufacturing the electrode according to the first embodiment of the present technology is described.

First, for example, the active material 2, the first binder, the second binder, and the inorganic oxide 3, and as necessary an additive are mixed together to prepare an electrode mixture, and the electrode mixture is dispersed in a solvent to prepare a paste-like electrode mixture slurry (composition for the electrode). The inorganic oxide 3 may be treated beforehand in an acidic solution containing a sulfonic acid group or a carboxylic acid group.

As the solvent, a non-aqueous solvent such as N-methyl-2-pyrrolidone (NMP) or water may be used. When, for example, PVdF is used as the first binder and a PVdF copolymer is used as the second binder, a non-aqueous solvent such as NMP is used as the solvent. On the other hand, when SBR or PAA is used as the first binder and a PVdF copolymer produced by emulsion polymerization is used as the second binder, water is used as the solvent. When SBR is used as the first binder, a thickener such as CMC is preferably added to the electrode mixture slurry in order to adjust the viscosity of the electrode mixture slurry.

Next, the prepared electrode mixture slurry is applied to the surface of the current collector 1A, the solvent is dried, and compression molding is performed with a roll presser or the like; thereby, the active material layer 1B is formed. Thus, the electrode 1 shown in FIG. 1 is obtained.

1.3 Effect

After impregnation with the electrolytic liquid, the electrode 1 according to the first embodiment contains the inorganic oxide 3 in the active material layer 1B in a state where the inorganic oxide 3 is extractable with THF or MEK at normal temperature. By fabricating a battery using the electrode 1 having such a configuration, the second binder swells by absorbing the electrolytic liquid, or the second binder dissolves in the electrolytic liquid. Thereby, the inorganic oxide 3 can be brought into sufficient contact with the electrolytic liquid in the pores of the active material layer 1B, and the ion conductivity in the active material layer 1B can be improved. Thus, the charging acceptability can be improved. Here, the electrolytic liquid may be an electrolytic liquid contained in a gel electrolyte.

1.4 Modification Examples

Modification Example 1

The active material layer 1B may contain an ambient temperature molten salt (ionic liquid) in place of the second binder. Since the drying temperature of the electrode mixture slurry is generally set to less than 200° C. in the drying process of the electrode mixture slurry, the ambient temperature molten salt is retained in the active material layer 1B even after subjected to the drying process.

As the ambient temperature molten salt, for example, a tertiary or quaternary ammonium salt composed of a tertiary or quaternary ammonium cation and an anion having a fluorine atom may be used. The ambient temperature molten salt refers to a salt at least part of which exhibits a liquid form at normal temperature. Here, the normal temperature is a temperature range in which usually the battery is supposed to operate. Specifically, it is the temperature range of more than or equal to approximately −50° C. and less than or equal to approximately 100° C., or more than or equal to approximately −20° C. and less than or equal to approximately 60° C. depending on circumstances.

In the active material layer 1B, the first binder preferably contains the inorganic oxide 3 and the ambient temperature molten salt. More specifically, it is preferable that the first binder and the ambient temperature molten salt be composited to form a composite and the inorganic oxide 3 be contained in the composite. This is because, after impregnation with the electrolytic liquid, the inorganic oxide 3 can thereby be put in the active material layer 1B in a state where the inorganic oxide 3 is extractable with THF or MEK at normal temperature. Here, the compositing refers to a state where the ambient temperature molten salt is incorporated in the polymer network structure of the first binder, and the first binder is swollen. The composite refers to a swollen body in such a state.

Since, as described above, the ambient temperature molten salt is retained in the active material layer 1B even after subjected to the drying process, the composite mentioned above is retained in the active material layer 1B in the state of being swollen even after subjected to the drying process.

When a battery is fabricated using the electrode 1 including the active material layer 1B of the configuration mentioned above, the electrolytic liquid supplied during the fabrication of the battery and the ambient temperature molten salt retained in the polymer network structure of the first binder are partially mixed in the direction in which they mutually diffuse. Thereby, part of the inorganic oxide 3 that is incorporated in the first binder together with the ambient temperature molten salt is caused to exist in a state of being in sufficient contact with the electrolytic liquid in the active material layer 1B. Therefore, the ion conductivity in the electrode 1 can be improved. Here, the electrolytic liquid may be an electrolytic liquid contained in a gel electrolyte.

The amount of the ambient temperature molten salt contained in the active material layer 1B is preferably more than or equal to 0.1 parts by mass and less than or equal to 10 parts by mass relative to 100 parts by mass of the active material. If the amount of the ambient temperature molten salt contained is less than 0.1 parts by mass, the first binder may not swell sufficiently, because the amount of the ambient temperature molten salt incorporated in the polymer network structure of the first binder is too small. Therefore, when a battery is fabricated using the electrode 1, there is a concern that the inorganic oxide 3 incorporated in the first binder cannot be in sufficient contact with the electrolytic liquid in the active material layer 1B. On the other hand, if the amount of the ambient temperature molten salt contained is more than 10 parts by mass, the first binder may swell excessively and the original function as a binder may be reduced, because the amount of the ambient temperature molten salt incorporated in the polymer network structure of the first binder is too large. Therefore, when a battery is fabricated using the electrode 1, the performance of the battery may be reduced.

The electrode 1 including the active material layer 1B of the configuration mentioned above is fabricated by adding, in place of the second binder, an ambient temperature molten salt to the electrode mixture slurry in the process of preparing the electrode mixture slurry (composition for the electrode). It is preferable that the ambient temperature molten salt be incorporated in the first binder together with the inorganic oxide 3 through the process of applying and drying the electrode mixture slurry, and be composited with the first binder.

Modification Example 2

The active material layer 1B may contain an ambient temperature molten salt (ionic liquid) together with the second binder. In this case, in the active material layer 1B, the first binder and the second binder may contain the inorganic oxide 3 and the ambient temperature molten salt. More specifically, the first binder and the second binder and the ambient temperature molten salt may be composited to form a composite and the inorganic oxide 3 may be contained in the composite. Here, the compositing refers to a state where the ambient temperature molten salt is incorporated in the polymer network structure of the first binder and the second binder, and the first binder and the second binder are swollen. The composite refers to a swollen body in such a state.

The electrode 1 including the active material layer 1B of the configuration mentioned above is fabricated by adding, together with the second binder, an ambient temperature molten salt to the electrode mixture slurry in the process of preparing the electrode mixture slurry (composition for the electrode). The ambient temperature molten salt may be incorporated in the first binder and the second binder together with the inorganic oxide 3 through the process of applying and drying the electrode mixture slurry, and may be composited with the first binder and the second binder.

2. Second Embodiment

In a second embodiment, a cylindrical non-aqueous electrolyte secondary battery including the electrode 1 according to the first embodiment described above is described. A non-aqueous electrolyte secondary battery according to the second embodiment and a battery pack including it may be used in order to be installed in or supply electric power to a device such as an electronic device, an electric vehicle, or an electricity storage device. As the electric vehicle, for example, a railway vehicle, a golf cart, an electric cart, an electric automobile (including a hybrid automobile), etc. are given, and the battery and the battery pack mentioned above are used as a driving power source or an auxiliary power source of these. As the electricity storage device, for example, a power source for electric power storage for buildings, typically such as houses, or for electricity generating facilities, etc. are given.

2.1 Configuration of the Battery

A configuration example of the non-aqueous electrolyte secondary battery according to the second embodiment of the present technology will now be described with reference to FIG. 2. The non-aqueous electrolyte secondary battery is, for example, what is called a lithium ion secondary battery in which the capacity of the negative electrode is expressed by the capacity component based on the occlusion and release of lithium (Li), which is an electrode reaction substance. The non-aqueous electrolyte secondary battery is of what is called a cylindrical type, and includes, in a battery can 11 that has an almost hollow circular columnar shape, a wound electrode body 20 in which a pair of band-like positive electrodes 21 and a band-like negative electrode 22 are stacked and wound via a separator 23. The battery can 11 is formed of iron (Fe) plated with nickel (Ni), and one end thereof is closed and the other end is opened. An electrolytic liquid as the electrolyte is introduced in the battery can 11, and is impregnated in the positive electrode 21, the negative electrode 22, and the separator 23. A pair of insulating plates 12 and 13 are placed perpendicular to the winding round surface so as to sandwich the wound electrode body 20.

A battery lid 14, and a safety valve mechanism 15 and a thermosensitive resistance element (positive temperature coefficient, PTC element) 16 provided inside the battery lid 14 are attached to the open end of the battery can 11 by being fastened via a sealing gasket 17. Thereby, the interior of the battery can 11 is sealed up. The battery lid 14 is formed of, for example, the same material as the battery can 11. The safety valve mechanism 15 is electrically connected to the battery lid 14, and is configured such that, when the internal voltage of the battery has become a certain value or more due to an internal short circuit, heating from the outside, etc., a disc plate 15A is inverted to cut off the electrical connection between the battery lid 14 and the wound electrode body 20. The sealing gasket 17 is formed of, for example, an insulating material, and its surface is coated with asphalt.

A center pin 24, for example, is inserted in the center of the wound electrode body 20. A positive electrode lead 25 made of aluminum (Al) or the like is connected to the positive electrode 21 of the wound electrode body 20, and a negative electrode lead 26 made of nickel or the like is connected to the negative electrode 22. The positive electrode lead 25 is electrically connected to the battery lid 14 by being welded to the safety valve mechanism 15, and the negative electrode lead 26 is welded and electrically connected to the battery can 11.

The positive electrode 21, the negative electrode 22, the separator 23, and the electrolytic liquid that constitute the non-aqueous electrolyte secondary battery will now be described in order with reference to FIG. 3.
(Positive Electrode)

The positive electrode 21 has a structure in which, for example, a positive electrode active material layer 21B is provided on both surfaces of a positive electrode current collector 21A. Although not shown, the positive electrode active material layer 21B may be provided only on one surface of the positive electrode current collector 21A. The positive electrode current collector 21A is formed of, for example, a metal foil such as aluminum foil, nickel foil, or stainless steel foil. The positive electrode active material layer 21B contains, for example, one or more positive electrode active materials. The positive electrode active material layer 21B may further contain an additive as necessary. As the additive, for example, at least one of an electrically conductive agent and a binder may be used.
(Positive Electrode Active Material)

The positive electrode active material contains, for example, a positive electrode material that can occlude and release lithium, which is an electrode reaction substance. As such a positive electrode material, for example, a lithium-containing compound such as a lithium oxide, a lithium sulfide, an intercalation compound containing lithium, or a lithium phosphate compound is given. Among them, a composite oxide containing lithium and a transition metal element or a phosphate compound containing lithium and a transition metal element is preferable, and a material containing at least one of cobalt (Co), nickel, manganese (Mn), iron, aluminum, vanadium (V), and titanium (Ti) as a transition metal element is particularly preferable. The chemical formula thereof is expressed by, for example, $Li_xMIO_2$ or $Li_yMIIPO_4$. In the formulae, MI and MII include one or more transition metal elements, and the values of x and y vary with the charging and discharging state of the battery, usually in the ranges of $0.05 \leq x \leq 1.10$ and $0.05 \leq y \leq 1.10$.

As specific examples of the composite oxide containing lithium and a transition metal element, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ (z<1)), a lithium nickel cobalt manganese composite oxide ($Li_xNi_{(1-v-w)}Co_vMn_wO_2$ (v+w<1)), a lithium manganese composite oxide ($LiMn_2O_4$) having the spinel structure, or the like is given. As specific examples of the phosphate compound containing lithium and a transition metal element, a lithium iron phosphate compound ($LiFePO_4$) or a lithium iron manganese phosphate compound ($LiFe_{1-u}Mn_uPO_4$ (u<1)) is given.

To increase the energy density, a lithium-containing compound containing lithium, a transition metal element, and oxygen (O) is preferable. As such a lithium-containing compound, for example, a lithium composite oxide having a structure like bedded rock salt shown in Formula (A), a lithium composite phosphate having the olivine structure shown in Formula (B), or the like is given. As the lithium-containing compound, a compound containing at least one of the group consisting of cobalt (Co), nickel (Ni), manganese (Mn), and iron (Fe) as a transition metal element is more preferable. As such a lithium-containing compound, for example, a lithium composite oxide having a structure like bedded rock salt shown in Formula (C), Formula (D), or Formula (E), a lithium composite oxide having the spinel structure shown in Formula (F), a lithium composite phosphate having the olivine structure shown in Formula (G), or the like is given; specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like is given.

$$Li_pNi_{(1-q-r)}Mn_qM1_rO_{(2-y)}X_z \quad (A)$$

(in Formula (A), M1 represents at least one selected from the group 2-15 elements excluding nickel (Ni) and manganese (Mn); X represents at least one of the group 16-17 elements excluding oxygen (O); and p, q, y, and z are values in the ranges of $0 \leq p \leq 1.5$, $0 \leq q \leq 1.0$, $0 \leq r \leq 1.0$, $-0.10 \leq y \leq 0.20$, and $0 \leq z \leq 0.2$)

$$Li_aM2_bPO_4 \quad (B)$$

(in Formula (B), M2 represents at least one selected from the group 2-15 elements; and a and b are values in the ranges of $0 \leq a \leq 2.0$ and $0.5 \leq b \leq 2.0$)

$$Li_jMn_{(1-g-h)}Ni_gM3_hO_{(2-j)}F_k \quad (C)$$

(in Formula (C), M3 represents at least one of the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); f, g, h, j, and k are values in the ranges of $0.8 \leq f \leq 1.2$, $0 < g < 0.5$, $0 \leq h \leq 0.5$, $g+h<1$, $-0.1 \leq j \leq 0.2$, and $0 \leq k \leq 0.1$; the composition of lithium varies with the state of charging and discharging; and the value of f shows the value in the fully discharged state)

$$Li_mNi_{(1-n)}M4_nO_{(2-p)}F_q \quad (D)$$

(in Formula (D), M4 represents at least one of the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); m, n, p, and q are values in the ranges of $0.8 \leq m \leq 1.2$, $0.005 \leq n \leq 0.5$, $-0.1 \leq p \leq 0.2$, and $0 \leq q \leq 0.1$; the composition of lithium varies with the state of charging and discharging; and the value of m shows the value in the fully discharged state)

$$Li_rCo_{(1-s)}M5_sO_{(2-t)}F_u \quad (E)$$

(in Formula (E), M5 represents at least one of the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); r, s, t, and u are values in the ranges of $0.8 \leq r \leq 1.2$, $0 \leq s < 0.5$, $-0.1 \leq t \leq 0.2$, and $0 \leq u \leq 0.1$; the composition of lithium varies with the state of charging and discharging; and the value of r shows the value in the fully discharged state)

$$Li_vMn_{2-w}M6_wO_xF_y \quad (F)$$

(in Formula (F), M6 represents at least one of the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); v, w, x, and y are values in the ranges of $0.9 \leq v \leq 1.1$, $0 \leq w \leq 0.6$, $3.7 \leq x \leq 4.1$, and $0 \leq y \leq 0.1$; the composition of lithium varies with the state of charging and discharging; and the value of v shows the value in the fully discharged state)

$$Li_zM7PO_4 \quad (G)$$

(in Formula (G), M7 represents at least one of the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); z is a value in the range of $0.9 \leq z \leq 1.1$; the composition of lithium varies with the state of charging and discharging; and the value of z shows the value in the fully discharged state)

As the positive electrode material that can occlude and release lithium, also other metal compounds or polymer materials may be given. As the other metal compound, for example, an oxide such as titanium oxide, vanadium oxide, or manganese dioxide, or a disulfide such as titanium sulfide or molybdenum sulfide is given. As the polymer material, for example, polyaniline or polythiophene is given.

(Binder)

As the binder, for example, a synthetic rubber such as SBR, a fluorine-based rubber, or an ethylene-propylene-diene rubber, or a polymer material such as PVdF is given, and they are used singly or in mixture of two or more.

(Electrically Conductive Agent)

As the electrically conductive agent, for example, a carbon material such as graphite, carbon black, or Ketjenblack is given, and they are used singly or in mixture of two or more. Other than carbon materials, any metal material, any electrically conductive polymer material, or the like that is a material having electrical conductivity may be used.

(Negative Electrode)

As the negative electrode 22, the electrode 1 according to the first embodiment is used. A specific configuration example of the negative electrode 22 will now be described.

The negative electrode 22 has a structure in which, for example, a negative electrode active material layer 22B is provided on both surfaces of a negative electrode current collector 22A. Although not shown, the negative electrode active material layer 22B may be provided only on one surface of the negative electrode current collector 22A. The negative electrode current collector 22A is formed of, for example, a metal foil such as copper foil, nickel foil, or stainless steel foil.

Figure 4:
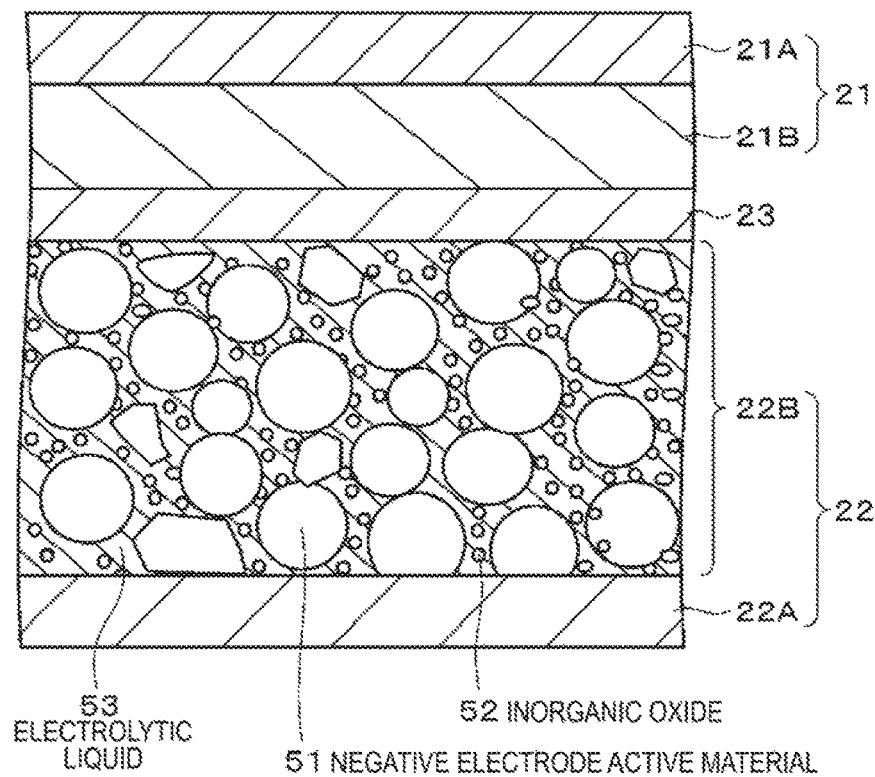
FIG. 4 is an enlarged cross-sectional view of the negative electrode active material layer shown in FIG. 3.

As shown in FIG. 4, the negative electrode active material layer 22B contains one or more kinds of negative electrode active material 51, an inorganic oxide 52, and a binder that is a resin (not shown). The negative electrode active material layer 22B may further contain an additive as necessary. As the additive, for example, at least one of an electrically conductive agent and a thickener may be used. The negative electrode active material layer 22B includes a plurality of voids such as pores. An electrolytic liquid 53 as the electrolyte exists in the voids. Although in FIG. 4 an example in which each void is filled with the electrolytic liquid 53 and the inorganic oxide 52 is in a state of floating in each void is shown, the configuration of the negative electrode active material layer 22B is not limited to this example, and it is sufficient that the inorganic oxide 52 and the electrolytic liquid 53 be able to be in sufficient contact in the negative electrode active material layer 22B.

The inorganic oxide 52 is in a state of being extractable with THF or MEK at normal temperature in the negative electrode active material layer 22B, more specifically in the active material layer 1B impregnated with the electrolytic liquid 53.

Whether the inorganic oxide 52 is in the state mentioned above or not can be assessed by the following sequence or the like. First, the non-aqueous electrolyte secondary battery is discharged as necessary, then part of the battery can 11, which is the outer casing, is cut away to expose a lower portion of the wound electrode body 20 (a portion of approximately ⅕ to ½ of the height of the wound electrode body 20), and the exposed portion is immersed in an extraction solvent (THF or MEK) and is allowed to stand still for approximately 3 hours to 48 hours. Alternatively, the extraction solvent and the wound electrode body 20 are put in a lidded container, and shaking is performed with a shaker to such a degree that the materials of the positive electrode 21 and the negative electrode 22 do not fall off physically. Otherwise, the sequence is similar to the assessment sequence in the first embodiment described above.

(Negative Electrode Active Material)

The negative electrode active material 51 contains a negative electrode material that can occlude and release lithium. As such a negative electrode material, for example, carbon materials such as hardly graphitizable carbon, easily graphitizable carbon, graphite, pyrolytic carbons, cokes, glassy carbons, organic polymer compound fired materials, carbon fibers, and activated carbon are given, and they may be used singly or in mixture of two or more. As the graphite, spherization-processed natural graphite or substantially spherical artificial graphite is preferably used. As the artificial graphite, artificial graphite obtained by graphitizing mesocarbon microbeads (MCMB) or artificial graphite obtained by graphitizing and pulverizing coke material is preferable. The average particle size of the graphite is preferably approximately 10 to 30 μm. As the cokes, pitch coke, needle coke, petroleum coke, or the like is given. The organic polymer compound fired material refers to a material obtained by carbonizing a polymer material such as a phenol resin or a furan resin by firing at an appropriate temperature, and some of them are categorized into hardly graphitizable carbon or easily graphitizable carbon. As the polymer material, also polyacetylene, polypyrrole, or the like is given. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Hardly graphitizable carbon is also preferable because good characteristics are obtained. Materials having low charging and discharging potentials, specifically, materials having charging and discharging potentials near to those of lithium metal are preferable because an increase in the energy density of the battery can be easily achieved.

As the negative electrode material that can occlude and release lithium, also a material that can occlude and release lithium, which is an electrode reaction substance, and contains at least one of a metal element and a semi-metal element as a constituent element is given. This is because a high energy density can be obtained by using such a material. In particular, using such a material together with a carbon material is more preferable because a high energy density can be obtained and also good cycle characteristics can be obtained. The negative electrode material may be a simple substance, an alloy, or a compound of a metal element or a semi-metal element, or may be a material that includes a phase of one or more of them at least partly. In the present technology, the alloy includes not only those made of two or more metal elements but also those containing one or more metal elements and one or more semi-metal elements. The alloy may contain also a non-metal element. As the organization thereof, a solid solution, a eutectic (eutectic mixture), or an intermetallic compound, or an organization in which two or more of them coexist is given.

As the metal element or the semi-metal element contained in the negative electrode material, for example, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt) is given. They may be a crystalline substance or an amorphous substance.

Among them, as the negative electrode material, a material containing a metal element or a semi-metal element of group 4B in the short-form periodic table as a constituent element is preferable, and a material containing at least one of silicon (Si) and tin (Sn) as a constituent element is particularly preferable. This is because silicon (Si) and tin (Sn) have high capability to occlude and release lithium (Li) and allow a high energy density to be obtained.

As the alloy of tin (Sn), for example, an alloy containing, as a second constituent element other than tin (Sn), at least one of the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) is given. As the alloy of silicon (Si), for example, an alloy containing, as a second constituent element other than silicon (Si), at least one of the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) is given.

As the compound of tin (Sn) or the compound of silicon (Si), for example, a compound containing oxygen (O) or carbon (C) is given, and the second constituent element described above may be contained in addition to tin (Sn) or silicon (Si).

Among them, as the negative electrode material, a SnCoC-containing material that contains cobalt (Co), tin (Sn), and carbon (C) as constituent elements and in which the amount of carbon contained is more than or equal to 9.9 mass % and less than or equal to 29.7 mass % and the proportion of cobalt (Co) to the total of tin (Sn) and cobalt (Co) is more than or equal to 30 mass % and less than or equal to 70 mass % is preferable. This is because a high energy density can be obtained and also good cycle characteristics can be obtained in such composition ranges.

The SnCoC-containing material may contain yet another constituent element as necessary. As the other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), or bismuth (Bi) is preferable, and two or more of them may be contained. This is because the capacity or the cycle characteristics can be further improved.

It is preferable that the SnCoC-containing material include a phase containing tin (Sn), cobalt (Co), and carbon (C), and the phase have a low-crystalline or amorphous structure. In the SnCoC-containing material, it is preferable that at least part of the carbon (C) that is a constituent element be bonded to a metal element or a semi-metal element that is another constituent element. This is because, in view of the fact that the reduction in cycle characteristics is presumably due to aggregation or crystallization of tin (Sn) etc., such aggregation or crystallization can be suppressed by the bonding of carbon (C) to another element.

As the negative electrode material that can occlude and release lithium, other metal compounds or polymer materials are given. As the other metal compound, an oxide such as lithium titanate ($Li_4Ti_5O_{12}$), manganese dioxide ($MnO_2$), or vanadium oxide ($V_2O_5$ or $V_6O_{13}$), a sulfide such as nickel sulfide (NiS) or molybdenum sulfide ($MoS_2$), or a lithium nitride such as lithium nitride ($Li_3N$) is given; and as the polymer material, polyacetylene, polyaniline, polypyrrole, or the like is given.

(Binder)

The binder is the same as the binder in the electrode 1 according to the first embodiment.

(Inorganic Oxide)

The inorganic oxide 52 is the same as the inorganic oxide 3 in the electrode 1 according to the first embodiment.

(Separator)

The separator 23 isolates the positive electrode 21 and the negative electrode 22 from each other, and allows lithium ions to pass through while preventing a short circuit of current caused by the contact of both electrodes. The separator 23 is formed of, for example, a porous membrane made of a synthetic resin made of polytetrafluoroethylene, polypropylene, polyethylene, or the like, or a porous membrane made of a ceramic, or may be a structure in which two or more of these porous membranes are stacked. Among them, a porous membrane made of a polyolefin is preferable because the short circuit prevention effect is good and an improvement in the safety of the battery by the shutdown effect can be achieved. In particular, polyethylene is preferable as the material that forms the separator 23 because shutdown effect can be obtained in the range of more than or equal to 100° C. and less than or equal to 160° C. and the electrochemical stability is good. Also polypropylene is preferable, and any other resin having chemical stability may be used by being copolymerized or blended with polyethylene or polypropylene.

(Electrolytic Liquid)

The separator 23, the positive electrode active material layer 21B, and the negative electrode active material layer 22B are impregnated with a non-aqueous electrolytic liquid, which is a non-aqueous electrolyte. The non-aqueous electrolytic liquid contains, for example, a solvent and an electrolyte salt. As the solvent, for example, ambient temperature molten salts of 4-fluoro-1,3-dioxolan-2-one, ethylene carbonate, propylene carbonate, butylene carbonate, vinylene carbonate, dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropionitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfite, trimethylhexylammonium bis(trifluoromethylsulfonyl)imide, and the like are given. Among them, at least one of the group consisting of 4-fluoro-1,3-dioxolan-2-one, ethylene carbonate, propylene carbonate, vinylene carbonate, dimethyl carbonate, ethyl methyl carbonate, and ethylene sulfite may be preferably mixed for use because good charging and discharging capacity characteristics and charging and discharging cycle characteristics can be obtained.

The electrolyte is not limited to liquid, and may be a gel electrolyte using PVdF or the like.

The electrolyte salt may be one material or may contain two or more materials mixedly. As the electrolyte salt, for example, lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), lithium tris(trifluoromethanesulfonyl)methyl ($LiC(SO_2CF_3)_3$), lithium chloride (LiCl), and lithium bromide (LiBr) are given.

In the non-aqueous electrolyte secondary battery having the configuration described above, when charging is performed, lithium ions are released from the positive electrode active material layer 21B, and are occluded into the negative electrode active material layer 22B via the electrolytic liquid 53, for example. When discharging is performed, lithium ions are released from the negative electrode active material layer 22B, and are occluded into the positive electrode active material layer 21B via the electrolytic liquid 53, for example.

2.2 Method for Manufacturing the Battery

Next, an example of the method for manufacturing the non-aqueous electrolyte secondary battery according to the second embodiment of the present technology is described.

First, for example, a positive electrode active material, an electrically conductive agent, and a binder are mixed together to prepare a positive electrode mixture, and the positive electrode mixture is dispersed in a solvent such as NMP to prepare a paste-like positive electrode mixture slurry. Next, the positive electrode mixture slurry is applied to the positive electrode current collector 21A, the solvent is dried, and compression molding is performed with a roll presser or the like to form the positive electrode active material layer 21B; thus, the positive electrode 21 is fabricated. The positive electrode active material layer 21B may be formed also by sticking the positive electrode mixture to the positive electrode current collector 21A.

The negative electrode active material 51 such as a carbon material, the inorganic oxide 52 such as a metal oxide, the first binder that is the first resin, and the second binder that is the second resin are mixed together to prepare a negative electrode mixture, and the negative electrode mixture is dispersed in a solvent to prepare a paste-like negative electrode mixture slurry, for example. As the solvent, for example, a non-aqueous solvent such as NMP or water may be used. Next, the negative electrode mixture slurry is applied to the negative electrode current collector 22A, the solvent is dried, and compression molding is performed with a roll presser or the like to form the negative electrode active material layer 22B; thus, the negative electrode 22 is fabricated. At this time, depending on the type of the graphite used as the negative electrode active material 51, the volume density (packing density) of the negative electrode active material layer 22B is preferably set to more than or equal to 1.5 g/cm$^3$ and less than or equal to 1.9 g/cm$^3$. This is because a non-aqueous electrolyte secondary battery having a high energy density while maintaining good input-output characteristics can be obtained. The negative electrode active material layer 22B may be formed also by sticking the negative electrode mixture to the negative electrode current collector 22A.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound via the separator 23. Next, the tip of the positive electrode lead 25 is welded to the safety valve mechanism 15 and the tip of the negative electrode lead 26 is welded to the battery can 11, and the positive electrode 21 and the negative electrode 22 wound are sandwiched by a pair of insulating plates 12 and 13 and are housed in the battery can 11. Next, after the positive electrode 21 and the negative electrode 22 are housed in the battery can 11, the electrolytic liquid 53 is introduced into the battery can 11 to be impregnated into the separator 23. By the introduction of the electrolytic liquid 53, the second binder swells largely or dissolves partly due to the electrolytic liquid 53, and the inorganic oxide 52 fixed by the second binder is caused to exist in a state of being in sufficient contact with the electrolytic liquid 53 in the negative electrode 22.

Next, the battery lid 14, the safety valve mechanism 15, and the thermosensitive resistance element 16 are fixed to the open end of the battery can 11 by being fastened via the sealing gasket 17. After that, the initial charging may be performed as necessary. In this case, during the charging or after the charging, it is preferable to perform aging at a temperature higher than room temperature (e.g. 45° C.) for several hours to several days. Thus, the secondary battery shown in FIG. 2 is obtained.

As described above, in the method for manufacturing the non-aqueous electrolyte secondary battery according to the second embodiment, the inorganic oxide 52 is added to the negative electrode mixture slurry. Therefore, in the non-aqueous electrolyte secondary battery fabricated by the manufacturing method, the inorganic oxide 52 is contained in a larger amount in the negative electrode 22, which is an electrode, than between the positive electrode 21 and the negative electrode 22. On the other hand, in a non-aqueous electrolyte secondary battery fabricated by a manufacturing method in which an inorganic oxide is added to the electrolyte, the inorganic oxide exist in a larger amount between the positive electrode and the negative electrode than in the electrode.

2.3 Effect

By the non-aqueous electrolyte secondary battery according to the second embodiment, the negative electrode 22 contains the inorganic oxide 52 in a state where the inorganic oxide 52 is extractable with THF or MEK at normal temperature. In the negative electrode 22 having such a configuration, the second binder is in a state of being swollen by absorbing the electrolytic liquid 53 as the electrolyte or of being dissolved in the electrolytic liquid 53. Therefore, the inorganic oxide 52 can be brought into sufficient contact with the electrolytic liquid 53 in the pores of the negative electrode active material layer 22B, and the ion conductivity in the negative electrode active material layer 22B can be improved. Thus, the charging acceptability can be improved. Furthermore, since the diffusion rate of Li ions in the electrode is increased, rapid charging becomes possible as compared to common non-aqueous electrolyte secondary batteries.

Since, as described above, the inorganic oxide 52 can be brought into sufficient contact with the electrolyte existing in the negative electrode active material layer 22B, the ion diffusion rate in the negative electrode active material layer 22B can be much improved over existing ones, and consequently an improvement in the charging rate and an improvement in the cycle life in rapid charging cycles can be achieved.

Since Li deposition and side reactions during charging are suppressed, the non-aqueous electrolyte secondary battery according to the second embodiment is effective also when cycles at a high charging rate are repeated over a long period of time or when it is required to reduce the charging time at low temperature.

In a common non-aqueous electrolyte secondary battery, when the thickness of the electrode is increased for the purpose of increasing the capacity etc., a reduction in charging and discharging rate characteristics due to insufficient ion diffusion in the electrode is a problem. In contrast, in the non-aqueous electrolyte secondary battery according to the second embodiment, charging and discharging rate characteristics can be ensured even when the thickness of the electrode is increased.

It is generally known that ion diffusivity is high on the surface of an inorganic oxide; in conventional technologies, the contact of the inorganic oxide with the electrolyte is insufficient because the inorganic oxide is fixed to the active material surface or the binder, and consequently it is difficult to sufficiently bring out the effect of improving the ion conductivity. In a technology in which an inorganic oxide is dispersed in an electrolytic liquid such as an ambient temperature molten salt beforehand, it is substantially difficult to obtain a desired dispersion state in the pores of the active material layer. In contrast, in the second embodiment, a high effect can be obtained for the improvement in input characteristics by dispersing the inorganic oxide 52 in the electrolyte in the active material layer. Furthermore, in the second embodiment, since the inorganic oxide 52 is caused to exist in a larger amount in the active material layer (including the electrolyte in the active material layer) than in the electrolyte layer between the positive and negative electrodes, a high effect can be obtained for the improvement in ion conductivity in the active material layer as compared to a technology in which the inorganic oxide 52 is mixed and dispersed in an electrolytic liquid, a gel electrolyte, or the like (e.g. Patent Literature 1).

2.4 Modification Examples

Modification Example 1

Although in the second embodiment the case where the electrode 1 according to the first embodiment is used as the negative electrode 22 is described as an example, the electrode 1 according to the first embodiment may be used as the positive electrode 21. Alternatively, the electrode 1 according to the first embodiment may be used as both of the positive electrode 21 and the negative electrode 22.

Modification Example 2

Although in the second embodiment the case where the electrode 1 according to the first embodiment is used as the negative electrode 22 is described as an example, the electrode 1 of Modification Example 1 or 2 of the first embodiment may be used as the negative electrode 22. Furthermore, the electrode 1 of Modification Example 1 or 2 of the first embodiment may be used as the positive electrode 21. Moreover, the electrode 1 of Modification Example 1 or 2 of the first embodiment may be used as both of the positive electrode 21 and the negative electrode 22.

3. Third Embodiment

In a third embodiment, a flat non-aqueous electrolyte secondary battery including the electrode 1 according to the first embodiment described above is described.

3.1 Configuration of the Battery

Figure 5:
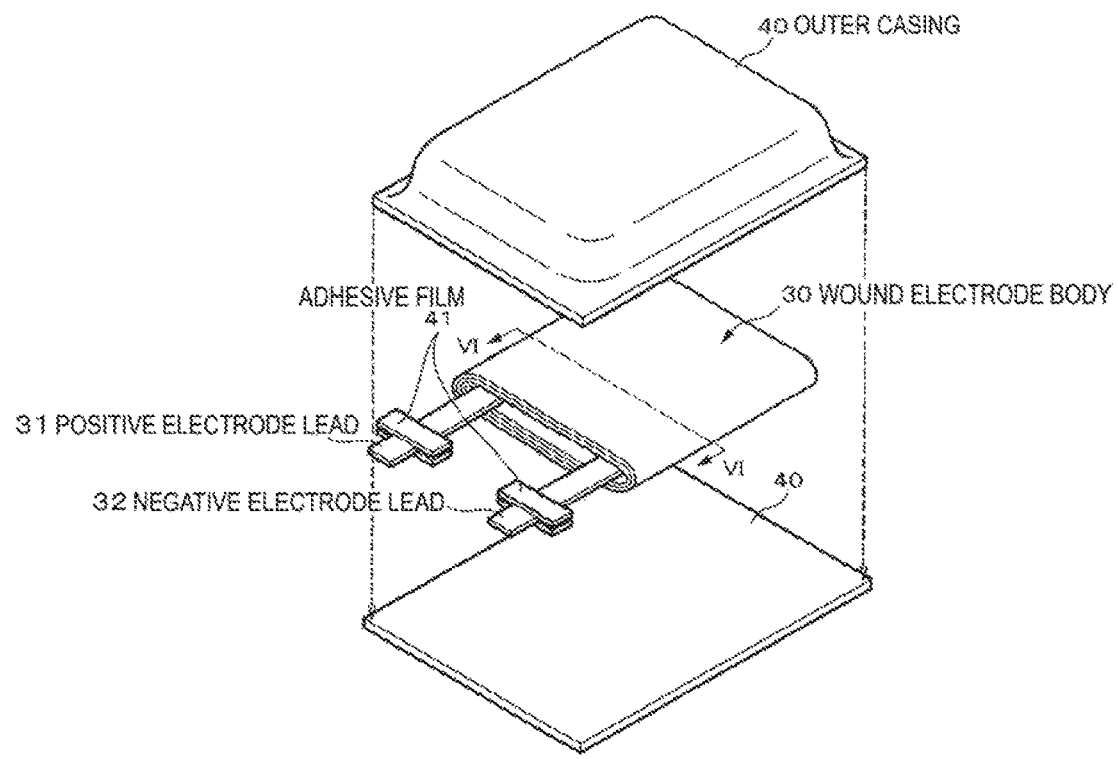
FIG. 5 is a disassembled perspective view showing a configuration example of a non-aqueous electrolyte secondary battery according to a third embodiment of the present technology.

FIG. 5 is a disassembled perspective view showing a configuration example of a non-aqueous electrolyte secondary battery according to the third embodiment of the present technology. The non-aqueous electrolyte secondary battery is of what is called a flat type; and in the battery, a wound electrode body 30 equipped with a positive electrode lead 31 and a negative electrode lead 32 is housed in a film-shaped outer casing 40, and size reduction, weight reduction, and thickness reduction are possible.

The positive electrode lead 31 and the negative electrode lead 32 are led out from the interior of the outer casing 40 toward the outside, for example in the same direction. Each of the positive electrode lead 31 and the negative electrode lead 32 is formed of, for example, a metal material such as aluminum, copper, nickel, or stainless steel, and is in a thin plate form or a netlike form.

The outer casing 40 is formed of, for example, a rectangular aluminum laminated film in which a nylon film, an aluminum foil, and a polyethylene film are stuck together in this order. The outer casing 40 is provided such that, for example, the polyethylene film side and the wound electrode body 30 face each other, and the outer edge portions are stuck together by fusion bonding or adhesive. An adhesive film 41 for preventing the entry of the outside air is inserted between the outer casing 40 and the positive electrode lead 31 and the negative electrode lead 32. The adhesive film 41 is formed of a material having adhesiveness to the positive electrode lead 31 and the negative electrode lead 32, for example a polyolefin resin such as polyethylene, polypropylene, a modified polyethylene, or a modified polypropylene.

The outer casing 40 may be formed of a laminated film of some other structure, a film of a polymer such as polypropylene, or a metal film in place of the aluminum laminated film described above.

Figure 6:
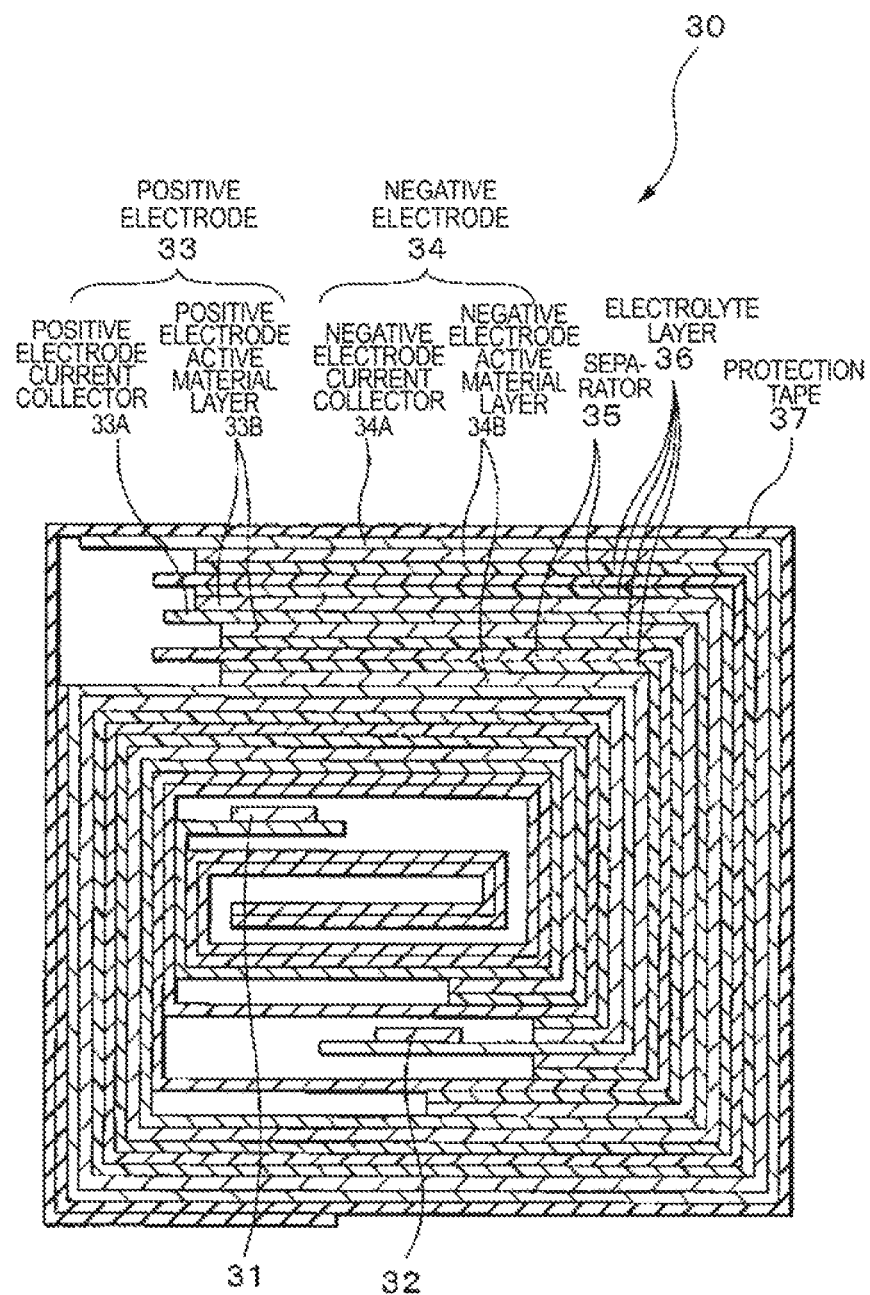
FIG. 6 is a cross-sectional view along line VI-VI of the wound electrode body shown in FIG. 5.

FIG. 6 is a cross-sectional view along line VI-VI of the wound electrode body 30 shown in FIG. 5. The wound electrode body 30 is a body in which a positive electrode 33 and a negative electrode 34 are stacked and wound via a separator 35 and an electrolyte layer 36, and the outermost peripheral portion is protected by a protection tape 37. The electrolyte layer 36 contains an electrolyte, and the electrolyte is impregnated in the positive electrode 33, the negative electrode 34, and the separator 35.

The positive electrode 33 has a structure in which a positive electrode active material layer 33B is provided on one surface or both surfaces of a positive electrode current collector 33A. The negative electrode 34 has a structure in which a negative electrode active material layer 34B is provided on one surface or both surfaces of a negative electrode current collector 34A, and the negative electrode active material layer 34B and the positive electrode active material layer 33B are placed so as to face each other. The configurations of the positive electrode current collector 33A, the positive electrode active material layer 33B, the negative electrode current collector 34A, the negative electrode active material layer 34B, and the separator 35 are the same as those of the positive electrode current collector 21A, the positive electrode active material layer 21B, the negative electrode current collector 22A, the negative electrode active material layer 22B, and the separator 23 in the second embodiment, respectively.

The electrolyte layer 36 contains an electrolytic liquid and a polymer compound serving as a retainer that retains the electrolytic liquid, and is in what is called a gel form. The electrolyte layer 36 in a gel form is preferable because a high ion conductivity can be obtained and the liquid leakage of the battery can be prevented. The composition of the electrolytic liquid is the same as that of the secondary battery according to the second embodiment. As the polymer compound, for example, polyacrylonitrile, poly(vinylidene fluoride), a copolymer of vinylidene fluoride and hexafluoropropylene, polytetrafluoroethylene, polyhexafluoropropylene, poly(ethylene oxide), poly(propylene oxide), a polyphosphazene, a polysiloxane, poly(vinyl acetate), poly(vinyl alcohol), poly(methyl methacrylate), poly(acrylic acid), poly(methacrylic acid), styrene-butadiene rubber, nitrile-butadiene rubber, polystyrene, or a polycarbonate is given. In particular, polyacrylonitrile, poly(vinylidene fluoride), polyhexafluoropropylene, or poly(ethylene oxide) is preferable from the viewpoint of electrochemical stability.

3.2 Method for Manufacturing the Battery

Next, an example of the method for manufacturing the non-aqueous electrolyte secondary battery according to the third embodiment of the present technology is described.

First, a precursor solution containing a solvent, an electrolyte salt, a polymer compound, a mixed resolvent is applied to each of the positive electrode 33 and the negative electrode 34, and the mixed resolvent is volatilized to form the electrolyte layer 36. Next, the positive electrode lead 31 is attached to an end portion of the positive electrode current collector 33A by welding, and the negative electrode lead 32 is attached to an end portion of the negative electrode current collector 34A by welding. Next, the positive electrode 33 and the negative electrode 34 on which the electrolyte layer 36 is formed are stacked via the separator 35 to form a stacked body, then the stacked body is wound in its longitudinal direction, and the protection tape 37 is stuck to the outermost peripheral portion to form the wound electrode body 30. Finally, for example, the wound electrode body 30 is interposed between the components of the outer casing 40, and the outer edge portions of the components of the outer casing 40 are stuck together and sealed up by thermal fusion bonding or the like. At this time, the adhesive film 41 is inserted between the positive electrode lead 31 and the negative electrode lead 32 and the outer casing 40. Thus, the secondary battery shown in FIG. 5 and FIG. 6 is obtained.

The secondary battery may be fabricated also in the following manner. First, the positive electrode 33 and the negative electrode 34 are fabricated in the above manner, and the positive electrode lead 31 and the negative electrode lead 32 are attached to the positive electrode 33 and the negative electrode 34, respectively. Next, the positive electrode 33 and the negative electrode 34 are wound via the separator 35, and the protection tape 37 is stuck to the outermost peripheral portion to form a wound body that is a precursor of the wound electrode body 30. Next, the wound body is interposed between the components of the outer casing 40, and the outer peripheral portions except one side are bonded together by thermal fusion bonding into a bag form; thus, the wound body is housed in the outer casing 40. Next, a composition for the electrolyte containing a solvent, an electrolyte salt, monomers serving as the source material of a polymer compound, and a polymerization initiator, and as necessary some other material such as a polymerization inhibitor is prepared, and is introduced into the outer casing 40.

Next, after the composition for the electrolyte is introduced into the outer casing 40, the opening of the outer casing 40 is sealed up by thermal fusion bonding in a vacuum atmosphere. Next, heat is applied to polymerize the monomers to form a polymer compound, and thereby the electrolyte layer 36 in a gel form is formed. Thus, the secondary battery shown in FIG. 6 is obtained.

3.3 Effect

The action and effect of the non-aqueous electrolyte secondary battery according to the third embodiment are similar to those of the non-aqueous electrolyte secondary battery according to the second embodiment.

3.4 Modification Examples

Modification Example 1

Although in the third embodiment the case where the electrode 1 according to the first embodiment is used as the negative electrode 34 is described as an example, the electrode 1 according to the first embodiment may be used as the positive electrode 33. Alternatively, the electrode 1 according to the first embodiment may be used as both of the positive electrode 33 and the negative electrode 34.

Modification Example 2

Although in the third embodiment the case where the electrode 1 according to the first embodiment is used as the negative electrode 34 is described as an example, the electrode 1 of Modification Example 1 or 2 of the first embodiment may be used as the negative electrode 34. Furthermore, the electrode 1 of Modification Example 1 or 2 of the first embodiment may be used as the positive electrode 33. Moreover, the electrode 1 of Modification Example 1 or 2 of the first embodiment may be used as both of the positive electrode 33 and the negative electrode 34.

4. Fourth Embodiment

In a fourth embodiment, an electronic device including any one of the non-aqueous electrolyte secondary batteries according to the second embodiment, Modification Examples 1 and 2 of the second embodiment, the third embodiment, and Modification Examples 1 and 2 of the third embodiment is described.

4.1 Rough Configuration of the Electronic Device

Figure 7:
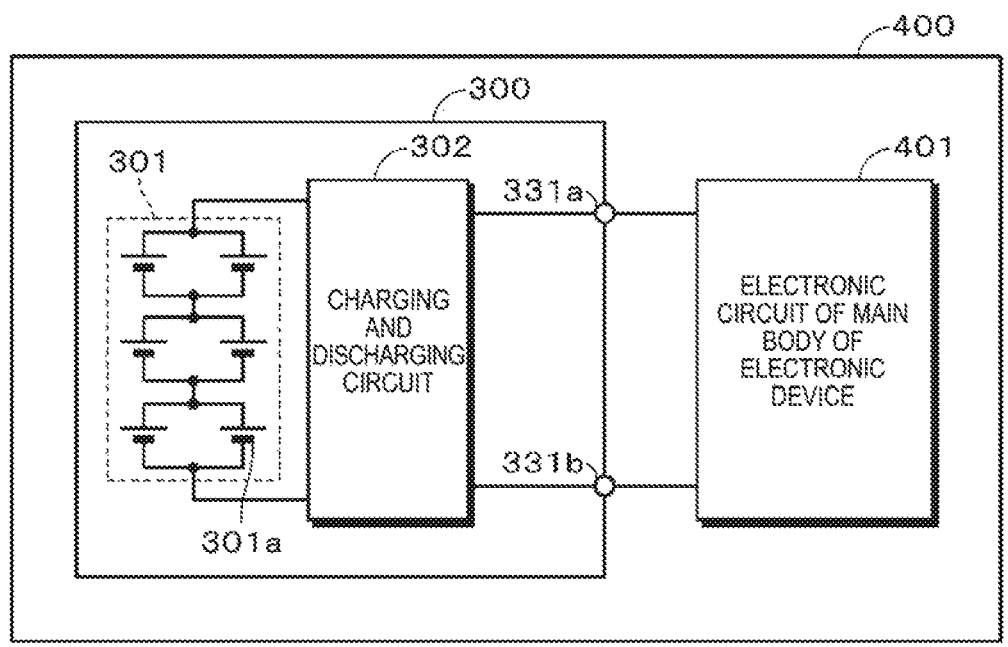
FIG. 7 is a block diagram showing a configuration example of an electronic device according to a fourth embodiment of the present technology.

An example of the rough configuration of an electronic device 400 according to the fourth embodiment of the present technology will now be described with reference to FIG. 7. The electronic device 400 includes an electronic circuit 401 of the main body of the electronic device and a battery pack 300. The battery pack 300 is electrically connected to the electronic circuit 401. The electronic device 400 has a configuration in which, for example, the battery pack 300 can be attached and detached by the user. The configuration of the electronic device 400 is not limited thereto, and the electronic device 400 may have a configuration in which the battery pack 300 is housed in the electronic device 400 so that the battery pack 300 cannot be detached from the electronic device 400 by the user.

During the charging of the battery pack 300, a positive electrode terminal 331a and a negative electrode terminal 331b of the battery pack 300 are connected to a positive electrode terminal and a negative electrode terminal of a charger (not shown), respectively. On the other hand, during the discharging of the battery pack 300 (during the use of the electronic device 400), the positive electrode terminal 331a and the negative electrode terminal 331b of the battery pack 300 are connected to a positive electrode terminal and a negative electrode terminal of the electronic circuit 401, respectively.

As the electronic device 400, for example, notebook personal computers, tablet computers, mobile phones (e.g. smartphones etc.), personal digital assistants (PDAs), imaging devices (e.g. digital still cameras, digital video cameras, etc.), audio devices (e.g. portable audio players), game machines, cordless phone handsets, electronic books, electronic dictionaries, radios, headphones, navigation systems, memory cards, pacemakers, hearing aids, electric tools, electric shavers, refrigerators, air conditioners, televisions, stereos, water heaters, microwave ovens, dishwashers, washing machines, driers, lighting devices, toys, medical devices, robots, load conditioners, traffic signals, etc. are given, but the electronic device 400 is not limited to them.
(Electronic Circuit)

The electronic circuit 401 includes, for example, a CPU, a peripheral logic unit, an interface unit, a memory unit, etc., and controls the entire electronic device 400.
(Battery Pack)

The battery pack 300 includes an assembled battery 301 and a charging and discharging circuit 302. The assembled battery 301 is formed by a plurality of secondary batteries 301a being connected in series and/or in parallel. The plurality of secondary batteries 301a are connected in n-parallel and in m-series (n and m being a positive integer), for example. In FIG. 7, an example in which 6 secondary batteries 301a are connected in 2-parallel and in 3-series (2P3S) is shown. As the secondary battery 301a, for example, any one of the non-aqueous electrolyte secondary batteries according to the second embodiment, Modification Examples 1 and 2 of the second embodiment, the third embodiment, and Modification Examples 1 and 2 of the third embodiment may be used.

During charging, the charging and discharging circuit 302 controls the charging on the assembled battery 301. On the other hand, during discharging (that is, during the use of the electronic device 400), the charging and discharging circuit 302 controls the discharging on the electronic device 400.

4.2 Configuration of the Charging and Discharging Circuit

Figure 8:
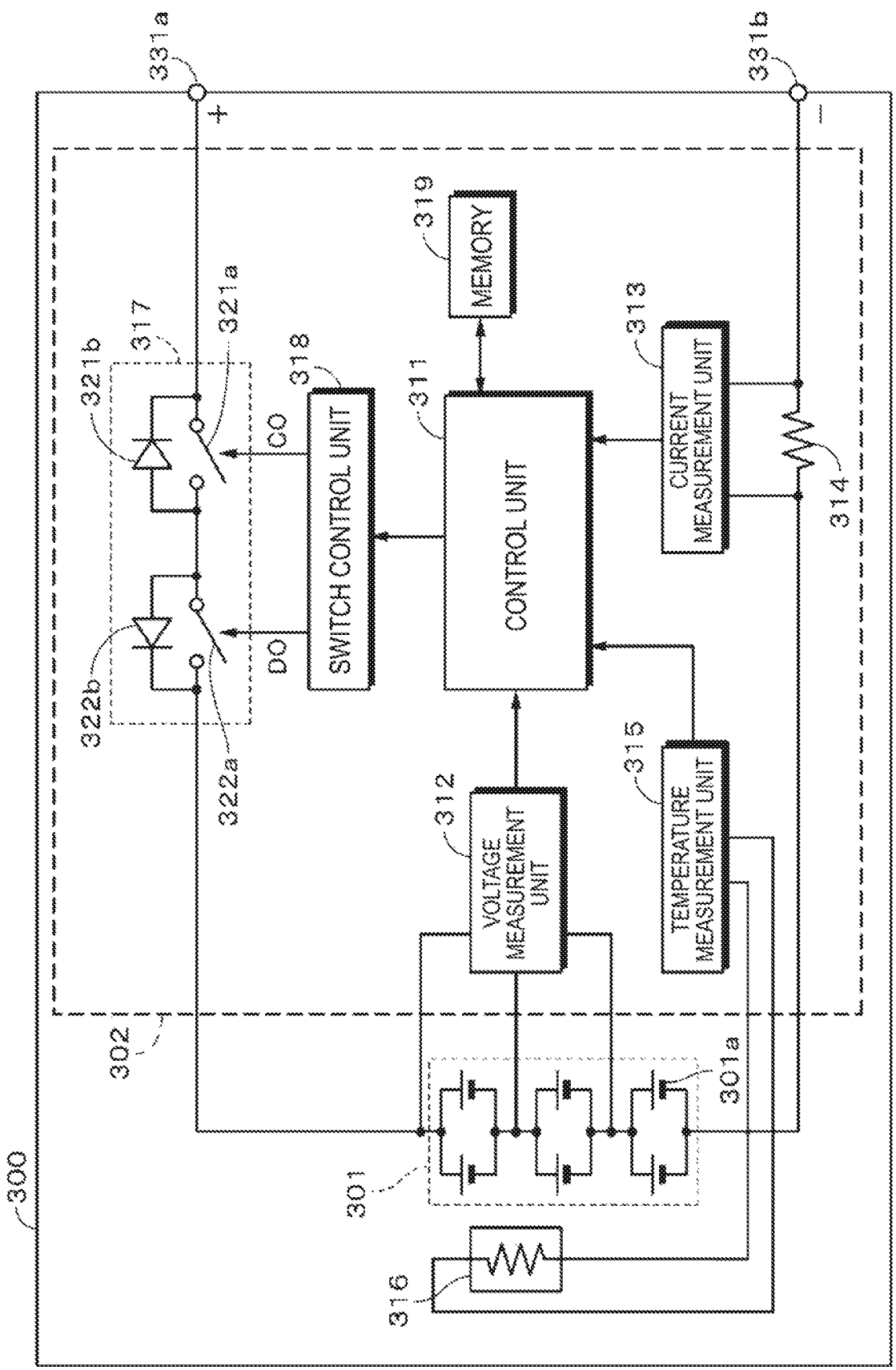
FIG. 8 is a block diagram showing a configuration example of a battery pack according to the fourth embodiment of the present technology.

A configuration example of the charging and discharging circuit 302 will now be described with reference to FIG. 8. The charging and discharging circuit 302 includes a control unit 311, a voltage measurement unit 312, a current measurement unit 313, a current detection resistance 314, a temperature measurement unit 315, a temperature detection element 316, a switch unit 317, a switch control unit 318, and a memory 319.
(Voltage Measurement Unit)

The voltage measurement unit 312 measures the voltage of the assembled battery 301 and/or each secondary battery 301a constituting it, and supplies the measurement result to the control unit 311.
(Current Measurement Unit)

The current measurement unit 313 measures the current using the current detection resistance 314, and supplies the measurement result to the control unit 311.
(Temperature Detection Element)

The temperature detection element 316 is a thermistor, for example, and is provided near the assembled battery 301.
(Temperature Measurement Unit)

The temperature measurement unit 315 measures the temperature of the assembled battery 301 using the temperature detection element 316, and supplies the measurement result to the control unit 311.
(Switch Unit)

The switch unit 317 includes a charging control switch 321a and a diode 321b, and a discharging control switch 322a and a diode 322b, and is controlled by the switch control unit 318. The diode 321b has a polarity in the reverse direction with respect to the charging current flowing in the direction from the positive electrode terminal 331a to the assembled battery 301 and in the forward direction with respect to the discharging current flowing in the direction from the negative electrode terminal 331b to the assembled battery 301. The diode 322b has a polarity in the forward direction with respect to the charging current and in the reverse direction with respect to the discharging current. Although in FIG. 8 a configuration in which the switch unit 317 is provided between the positive electrode terminal 331a and the assembled battery 301 is shown as an example, the switch unit 317 may be provided between the negative electrode terminal 331b and the assembled battery 301.

The charging control switch 321a is controlled by the switch control unit 318 so as to, when the battery voltage has become the overcharging detection voltage, be set to OFF to prevent a charging current from flowing through the current path of the assembled battery 301. After the charging control switch is set to OFF, only discharging via the diode 321b is possible. The charging control switch 321a is controlled by the switch control unit 318 so as to, when a large current flows during charging, be set to OFF to cut off the charging current flowing through the current path of the assembled battery 301.

The discharging control switch 322a is controlled by the switch control unit 318 so as to, when the battery voltage has become the overdischarging detection voltage, be set to OFF to prevent a discharging current from flowing through the current path of the assembled battery 301. After the discharging control switch 322a is set to OFF, only charging via the diode 322b is possible. The discharging control switch 322a is controlled by the switch control unit 318 so as to, when a large current flows during discharging, be set to OFF to cut off the discharging current flowing through the current path of the assembled battery 301.
(Switch Control Unit)

The switch control unit 318 controls the charging control switch 321a and the discharging control switch 322a of the switch unit 317 on the basis of the voltage and the current inputted from the voltage measurement unit 312 and the current measurement unit 313. When the voltage of any one of the secondary batteries 301a has become the overcharging detection voltage or the overdischarging detection voltage or more, or when a large current flows rapidly, the switch control unit 318 sends a control signal to the switch unit 317 to prevent overcharging and overdischarging, and overcurrent charging and discharging.

In the case where the secondary battery 301a is, for example, a lithium ion secondary battery, the overcharging detection voltage is set to 4.20 V±0.05 V, for example, and the overdischarging detection voltage is set to 2.4 V±0.1 V, for example.

For the charging control switch 321a and the discharging control switch 322a, a semiconductor switch such as a MOSFET may be used, for example. In this case, the parasitic diode of the MOSFET functions as a diode. When a P-channel FET is used as the charging and discharging switches, the switch control unit 318 supplies control signals CO and DO to the gates of the charging control switch 321a and the discharging control switch 322a, respectively. The charging control switch 321a and the discharging control switch 322a, when they are of a P-channel type, become ON by means of a gate potential lower than the source potential by a prescribed value or more. That is, in normal charging and discharging operation, the control signals CO and DO are set to a low level, and the charging control switch 321a and the discharging control switch 322a are set to the ON state. At the time of, for example, overcharging or overdischarging, the control signals CO and DO are set to a high level, and the charging control switch 321a and the discharging control switch 322a are set to the OFF state.
(Memory)

The memory 319 includes, for example, a RAM or a ROM, and more specifically includes an erasable programmable read only memory (EPROM), which is a nonvolatile memory. In the memory 319, information such as numerical values calculated in the control unit 311 and the internal resistance value of each secondary battery 301a in the initial state measured in a stage of the manufacturing process is stored beforehand, and the information can be rewritten as appropriate. Furthermore, the information of the full charging capacity of the secondary battery 301a may be stored in the memory 319, and thereby the control unit 311 can use the information of the full charging capacity to calculate the remaining capacity of the battery pack 300.

(Control Unit)

The control unit 311 controls each part of the charging and discharging circuit 302.

5. Fifth Embodiment

In a fifth embodiment, an electricity storage system that includes, in an electricity storage device, any one of the non-aqueous electrolyte secondary batteries according to the second embodiment, Modification Examples 1 and 2 of the second embodiment, the third embodiment, and Modification Examples 1 and 2 of the third embodiment is described.
[Configuration of the Electricity Storage System]

Figure 9:
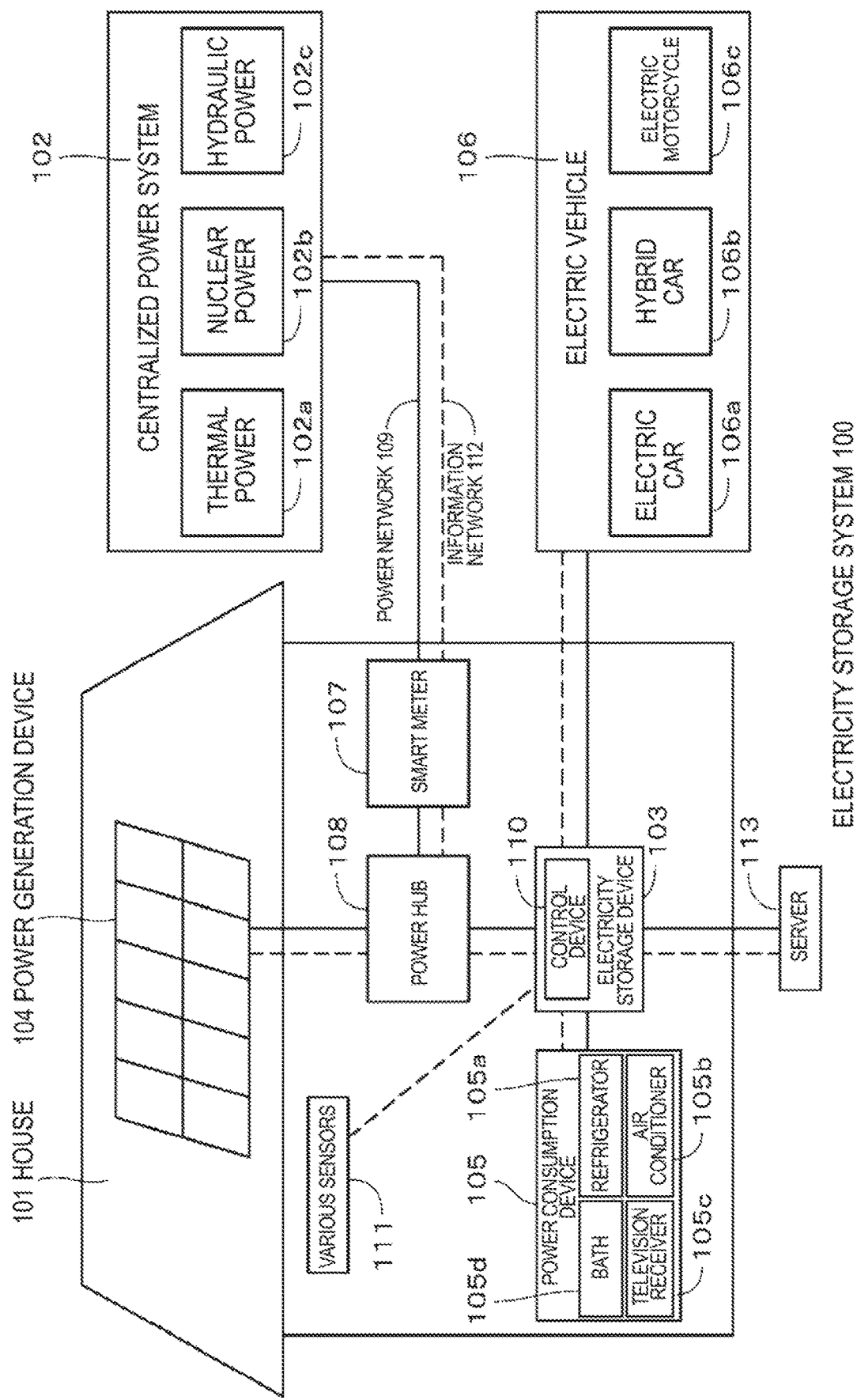
FIG. 9 is a schematic diagram showing a configuration example of an electricity storage system according to a fifth embodiment of the present technology.

A configuration example of an electricity storage system 100 according to the fifth embodiment will now be described with reference to FIG. 9. The electricity storage system 100 is an electricity storage system for houses, and in this system, power is supplied to an electricity storage device 103 from a centralized power system 102 such as thermal power 102a, nuclear power 102b, and hydraulic power 102c through a power network 109, an information network 112, a smart meter 107, a power hub 108, etc. Together with this, power is supplied to the electricity storage device 103 from an independent power source such as a domestic power generation device 104. The power supplied to the electricity storage device 103 is stored. The power used in the house 101 is supplied using the electricity storage device 103. The same electricity storage system can be used not only in the house 101 but also in buildings.

The house 101 is provided with the domestic power generation device 104, a power consumption device 105, the electricity storage device 103, a control device 110 controlling each device, the smart meter 107, the power hub 108, and sensors 111 acquiring various kinds of information. The devices are connected through the power network 109 and the information network 112. A solar cell, a fuel cell, etc. are used as the domestic power generation device 104, and generated power is supplied to the power consumption device 105 and/or the electricity storage device 103. The power consumption device 105 is a refrigerator 105a, an air conditioner 105b, a television receiver 105c, a bath 105d, etc. Moreover, the power consumption device 105 includes an electric vehicle 106. The electric vehicle 106 is an electric car 106a, a hybrid car 106b, and an electric motorcycle 106c.

The electricity storage device 103 includes any one of the non-aqueous electrolyte secondary batteries according to the second embodiment, Modification Examples 1 and 2 of the second embodiment, the third embodiment, and Modification Examples 1 and 2 of the third embodiment. The smart meter 107 has a function of measuring a use amount of commercial power and transmitting the measured use amount to an electric power company. The power network 109 may be of one of direct current power supply, alternating current power supply, and noncontact power supply or of the combination of a plurality of them.

The various sensors 111 are a human sensor, an illumination sensor, an object detection sensor, a power consumption sensor, a vibration sensor, a contact sensor, a temperature sensor, an infrared sensor, etc., for example. The information acquired by the various sensors 111 is transmitted to the control device 110. Weather conditions, human conditions, etc. are grasped based on the information from the sensors 111, and it is possible to automatically control the power consumption device 105 so that energy consumption is minimum. Moreover, the control device 110 can transmit information about the house 101 to an external electric power company, etc. through an internet.

The power hub 108 performs processing of branch of a power line, direct current-alternating current conversion, etc. As a communication system of the information network 112 connected to the control device 110, there are a method of using a communication interface such as a universal asynchronous receiver-transceiver (UART (transmission and reception circuit for asynchronous serial communication)) and a method of using a sensor network by a wireless communication standard such as Bluetooth (registered trademark), ZigBee, and Wi-Fi. The Bluetooth system is applied to multimedia communication, and the communication of one-to-many connection is possible. The ZigBee uses a physical layer of institute of electrical and electronics engineers (IEEE) 802.15.4. The IEEE 802.15.4 is a name of a short distance wireless network standard referred to as personal area network (PAN) or Wireless (W) PAN.

The control device 110 is connected to an external server 113. The server 113 may be managed by any of the house 101, an electric power company, and a service provider. The information transmitted and received by the server 113 is power consumption information, life pattern information, power rates, weather information, natural disaster information, and information about power transaction, for example. Such information may be transmitted and received by a domestic power consumption device (a television receiver, for example), and may be transmitted and received by a device outside home (a cellular phone, etc., for example). Such information may be displayed on a device having a display function, e.g. a television receiver, a cellular phone, personal digital assistants (PDA), etc.

The control device 110 that controls each part is composed of a central processing unit (CPU), a random access memory (RAM), a read only memory (ROM), etc., and is housed in the electricity storage device 103 in this example. The control device 110 is connected to the electricity storage device 103, the domestic power generation device 104, the power consumption device 105, the various sensors 111, and the server 113 through the information network 112, and has a function of adjusting a use amount of commercial power and a power generation amount, for example. In addition, the control device 110 may have a function of performing power transaction in the power market, etc.

As illustrated above, not only power from the centralized power system 102 such as the thermal power 102a, the nuclear power 102b, and the hydraulic power 102c but also power generated by the domestic power generation device 104 (solar power generation, wind power generation) can be stored in the electricity storage device 103. Therefore, even when power generated by the domestic power generation device 104 is varied, it is possible to perform control of keeping electric energy transmitted to the outside constant or discharging only a required amount. For example, it is also possible to adopt a use in which power obtained by solar power generation is stored in the electricity storage device 103 and, at the same time, midnight power that is cheaper in cost during night is stored in the electricity storage device 103 so that the power stored by the electricity storage device 103 is discharged and used in the daytime period when the cost is high.

Note that although this example describes the case in which the control device 110 is stored in the electricity storage device 103, the control device 110 may be stored in the smart meter 107 or may be constituted individually. Moreover, the electricity storage system 100 may be used for a plurality of households in an apartment house, or may be used for a plurality of detached houses.

6. Sixth Embodiment

In a sixth embodiment, an electric vehicle that includes any one of the non-aqueous electrolyte secondary batteries according to the second embodiment, Modification Examples 1 and 2 of the second embodiment, the third embodiment, and Modification Examples 1 and 2 of the third embodiment is described.

Figure 10:
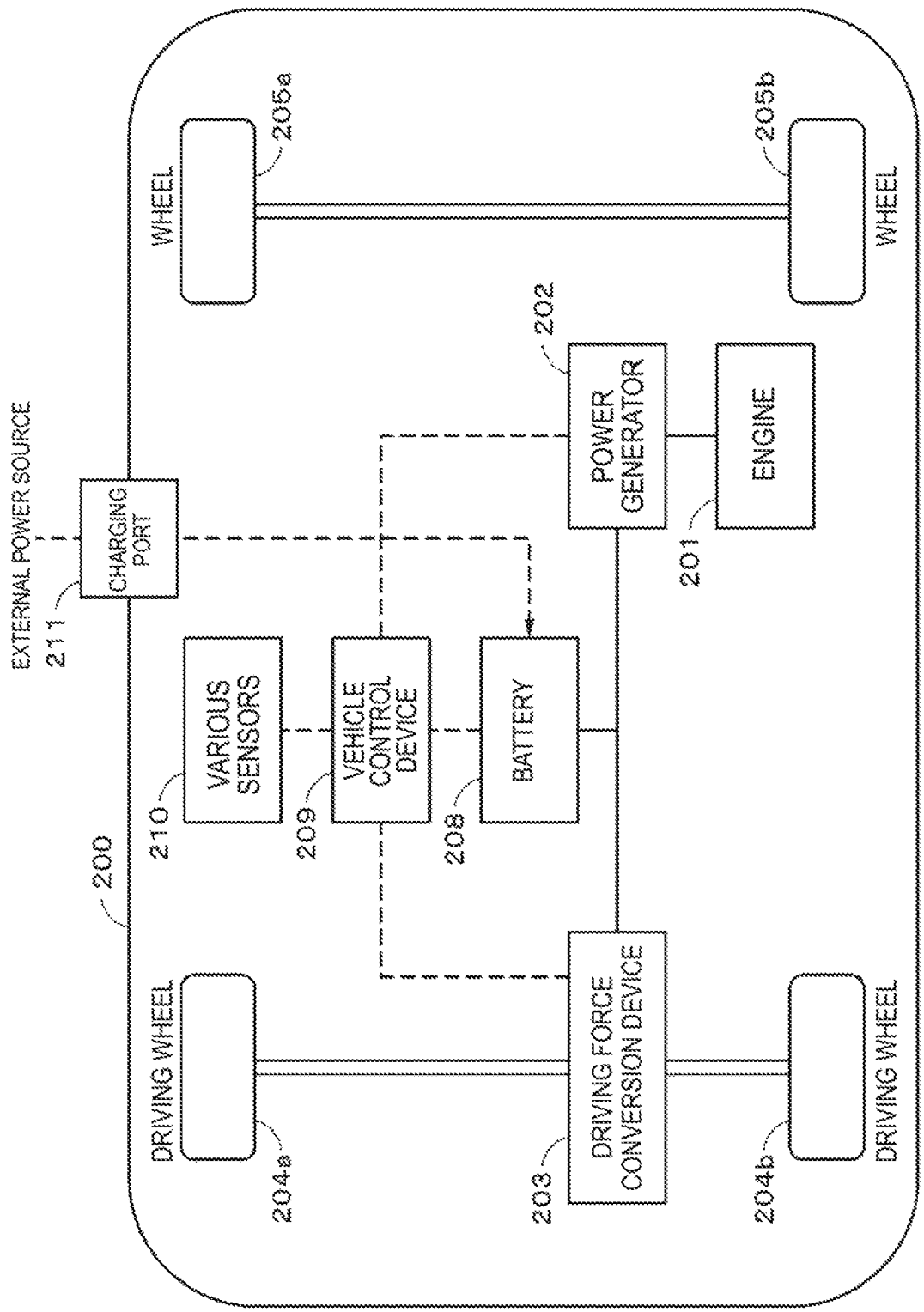
FIG. 10 is a schematic diagram showing a configuration of an electric vehicle according to a sixth embodiment of the present technology.

A configuration of an electric vehicle according to the sixth embodiment of the present technology will now be described with reference to FIG. 10. A hybrid vehicle 200 is a hybrid vehicle employing a series hybrid system. The series hybrid system is a car traveling by an electric power/driving force conversion device 203 using power generated by a power generator driven by an engine or such power stored temporarily in a battery.

On this hybrid vehicle 200, an engine 201, a power generator 202, an electric power/driving force conversion device 203, a driving wheel 204a, a driving wheel 204b, a wheel 205a, a wheel 205b, a battery 208, a vehicle control device 209, various sensors 210, and a charging port 211 are mounted. As the battery 208, any one of the non-aqueous electrolyte secondary batteries according to the second embodiment, Modification Examples 1 and 2 of the second embodiment, the third embodiment, and Modification Examples 1 and 2 of the third embodiment is used.

The hybrid vehicle 200 travels with the electric power/driving force conversion device 203 as a driving source. One example of the electric power/driving force conversion device 203 is a motor. The electric power/driving force conversion device 203 is driven by power of the battery 208, and the rotation force of the electric power/driving force conversion device 203 is transmitted to the driving wheels 204a and 204b. Note that with the use of direct current-alternating current (DC-AC) or inverse conversion (AC-DC conversion) at necessary parts, the electric power/driving force conversion device 203 can be also applied to an alternating current motor and a direct current motor. The various sensors 210 control engine speed through the vehicle control device 209 and controls opening of a throttle valve not illustrated (throttle opening). The various sensors 210 include a speed sensor, an acceleration sensor, an engine speed sensor, etc.

The rotation force of the engine 201 is transmitted to the power generator 202, and power generated by the power generator 202 using the rotation force can be stored in the battery 208.

When the speed of the hybrid vehicle 200 is reduced by a braking mechanism not illustrated, the resistance at the time of reduction of speed is added to the electric power/driving force conversion device 203 as rotation force, and regenerative electric power generated by the electric power/driving force conversion device 203 using the rotation force is stored in the battery 208.

The battery 208 is connected to an external power source of the hybrid vehicle 200 via the charging port 211, and thus receives power supply from the external power source with the charging port 211 as an input port and can also store the received power.

Although not illustrated, there may be provided an information processing device performing information processing regarding vehicle control based on information about the secondary batteries. Such an information processing device includes an information processing device performing battery remaining amount display based on information about a battery remaining amount.

The above has described, as an example, the series hybrid car traveling by a motor using power generated by the power generator driven by the engine or such power temporarily stored in the battery. However, the present technology can be also applied effectively to a parallel hybrid car having output of both an engine and a motor as a driving source and using three systems of travel only by the engine, travel only by the motor, and travel by the engine and the motor while switching them appropriately. Moreover, the present technology can be also applied effectively to a so-called electric vehicle, which travels by drive by only a driving motor without an engine.

EXAMPLES

The present technology will now be specifically described using Examples, but the present technology is not limited to these Examples.

(Average Particle Size of the Inorganic Oxide)

In the Examples, the average particle size (diameter) of the inorganic oxide was found in the following manner. First, using a transmission electron microscope (TEM), the inorganic oxide ($Al_2O_3$, $ZrO_2$, $TiO_2$, and $SiO_2$) was found to be spherical particles. Next, the specific surface area was measured by nitrogen adsorption, and the specific surface area was applied to the following relation (a relation between the specific surface area and the particle size (diameter) on the assumption that the inorganic oxide is in a spherical shape (a regular sphere)) to find the average particle size of the inorganic oxide.

$$d=6/(\rho s)$$

(where d: the particle size, $\rho$: the density, s: the specific surface area on the assumption that the inorganic oxide is in a spherical shape)

Example 1-1

A negative electrode was fabricated in the following manner. First, artificial graphite powder with an average particle size of 20 μm was prepared as the negative electrode active material. The lattice spacing $d_{002}$ in the c-axis direction of the artificial graphite powder calculated by X-ray diffraction was approximately 0.3360 nm. Next, 100 parts by mass of the graphite powder was mixed with 3 parts by mass of PVdF (a homopolymer of VdF), which is the first binder, and 3 parts by mass of a PVdF-HFP copolymer, which is the second binder, and the mixture was dispersed in NMP, which is a solvent, to obtain a mixed liquid. Here, as the PVdF-HFP copolymer, a copolymer containing PVdF and HFP at a ratio of 90 mass %:10 mass % was used. As described above, the PVdF, which is the first binder, is a general-role binder that is mainly in charge of the adhesive strength of the electrode and has low swellability to the electrolytic liquid. On the other hand, the PVdF-HFP copolymer, which is the second binder, is a binder that swells largely or dissolves partly to the solvent of the electrolytic liquid. Next, 2 parts by mass of $Al_2O_3$ (inorganic oxide) with an average particle size of 30 nm was added to the mixed liquid, and mixing was performed thoroughly; thus, a negative electrode mixture coating material was obtained.

Next, the negative electrode mixture coating material was uniformly applied to both surfaces of a negative electrode current collector made of band-like copper foil with a thickness of 15 μm, and drying and pressing were performed to form a negative electrode active material layer on both surfaces of the negative electrode current collector; thus, a negative electrode was obtained. At this time, the thickness of the negative electrode active material layer on one surface of the negative electrode current collector was set to 70 μm, and the volume density was set to 1.60 g/cm$^3$. Thus, the negative electrode of the objective was obtained.

Example 1-2

A negative electrode was obtained in the same manner as Example 1-1 except that a PVdF-HFP copolymer containing PVdF and HFP at a ratio of 80 mass %:20 mass % was used as the second binder.

Example 1-3

A negative electrode was obtained in the same manner as Example 1-1 except that a PVdF-CTFE copolymer containing PVdF and CTFE at a ratio of 85 mass %:15 mass % was used as the second binder.

Example 1-4

A negative electrode was obtained in the same manner as Example 1-1 except that a PVdF-HFP-CTFE copolymer containing PVdF, HFP, and CTFE at a ratio of 88 mass %:6 mass %:6 mass % was used as the second binder.

Example 1-5

The amount of blended PVdF (a homopolymer of VdF), which is the first binder, was altered to 5 parts by mass. The amount of blended Al$_2$O$_3$ (inorganic oxide) with an average particle size of 30 nm was altered to 4 parts by mass. Otherwise, the procedure was the same as Example 1-1, and a negative electrode was obtained.

Example 1-6

A negative electrode was obtained in the same manner as Example 1-5 except that ZrO$_2$ (inorganic oxide) with an average particle size of 50 nm was used in place of Al$_2$O$_3$ (inorganic oxide) with an average particle size of 30 nm.

Example 1-7

A negative electrode was obtained in the same manner as Example 1-5 except that TiO$_2$ (inorganic oxide) with an average particle size of 80 nm was used in place of Al$_2$O$_3$ (inorganic oxide) with an average particle size of 30 nm.

Example 1-8

A negative electrode was obtained in the same manner as Example 1-5 except that SiO$_2$ (inorganic oxide) with an average particle size of 20 nm was used in place of Al$_2$O$_3$ (inorganic oxide) with an average particle size of 30 nm.

Example 1-9

A negative electrode was obtained in the same manner as Example 1-5 except that, as the second binder, 4 parts by mass of N-methyl-N-propylpiperidinium bis(trifluoromethanesulfonyl)amide (PP13-TFSA), which is an ambient temperature molten salt of a quaternary ammonium salt, was blended instead of blending 3 parts by mass of the PVdF-HFP copolymer.

Example 1-10

Water was used as the solvent in place of NMP. 4 parts by mass of emulsion-polymerized PVdF (Arkema K.K., Kynar series) was blended as the first binder. 3 parts by mass of an emulsion-polymerized PVdF-HFP copolymer (Arkema K.K., Kynar series) was blended as the second binder. Here, a copolymer containing PVdF and HFP at a ratio of 90 mass %:10 mass % was used as the PVdF-HFP copolymer. Otherwise, the procedure was the same as Example 1-1, and a negative electrode was obtained.

Example 1-11

A negative electrode was obtained in the same manner as Example 1-10 except that 2 parts by mass of SBR was blended as the first binder.

Comparative Example 1-1

The amount of blended PVdF (a homopolymer of VdF), which is the first binder, was altered to 5 parts by mass. The blending of the second binder and the inorganic oxide was omitted. Otherwise, the procedure was the same as Example 1-1, and a negative electrode was obtained.

Comparative Example 1-2

The amount of blended PVdF (a homopolymer of VdF), which is the first binder, was altered to 5 parts by mass. The blending of the second binder was omitted. Otherwise, the procedure was the same as Example 1-1, and a negative electrode was obtained.

Comparative Example 1-3

The amount of blended PVdF (a homopolymer of VdF), which is the first binder, was altered to 5 parts by mass. 2 parts by mass of Al$_2$O$_3$ (inorganic oxide) with an average particle size of 3000 nm (3 μm) was blended as the inorganic oxide. Otherwise, the procedure was the same as Example 1-1, and a negative electrode was obtained.
(Whether the Inorganic Oxide is Extractable or not)

Whether or not, after impregnation with the electrolytic liquid, the negative electrode of Examples 1-1 to 1-11 and Comparative Examples 1-1 to 1-3 obtained in the above manner contained the inorganic oxide in the negative electrode active material layer in a state where the inorganic oxide was extractable with THF or MEK was assessed by the following sequence. First, the electrolytic liquid in an amount substantially equal to the amount of the electrolytic liquid that the negative electrode absorbs during battery assembly was dropped onto and impregnated into the applied and dried negative electrode (here, an electrolyte salt may be present or absent). After that, the negative electrode was loosely wound or folded and was stood in a suitable container, and a lower portion of the electrode (a portion of approximately ⅕ to ½ in the thickness direction) was immersed in an extraction solvent (THF or MEK) and was allowed to stand still for approximately 3 hours to 48 hours. At this time, the ambient temperature was set to normal temperature, that is, 20° C.±15° C. provided by Japanese Industrial Standards (JIS). This is because an excessively increased temperature may cause large swelling or dissolution to occur up to the first binder for the original electrode binding (the PVdF copolymer or SBR), and an excessively low temperature may cause the extraction to take a long time.

Next, the extraction solvent was recovered and evaporated to dryness at 800° C. or more, and then the mass of the residue was measured. Next, on the basis of the measurement result, whether or not, after impregnation with the electrolytic liquid, the negative electrode contained the inorganic oxide in the negative electrode active material layer in a state where the inorganic oxide was extractable with THF or MEK was determined by the following criterion. Here, the fact that the residue was the added prescribed inorganic oxide was found by qualitative analysis based on XRD (X-ray diffraction).

Extractable state: the case where 5 mass % or more of the amount of the inorganic oxide blended in the process of preparing the electrode coating material, or 0.001 parts by mass or more of the inorganic oxide relative to 100 parts by mass of the negative electrode active material blended in the process of preparing the electrode coating material has been found Non-extractable state: the case where neither 5 mass % or more of the amount of the inorganic oxide blended in the process of preparing the electrode coating material, nor 0.001 parts by mass or more of the inorganic oxide relative to 100 parts by mass of the negative electrode active material blended in the process of preparing the electrode coating material has been found In Table 1, "the extractable state" is shown by "○," and "the non-extractable state" is shown by "x."

Table 1 shows the configuration and evaluation result of the negative electrode of Examples 1-1 to 1-11 and Comparative Examples 1-1 to 1-3.

TABLE 1

| | First binder | | Second binder | | Solvent of electrode coating material | High-boiling solvent addition | |
|---|---|---|---|---|---|---|---|
| | Type | Amount of blending [parts by mass] | Type | Amount of blending [parts by mass] | | Type | Amount of blending [parts by mass] |
| Example 1-1 | PVdF | 3 | PVdF(90)/HFP(10) | 3 | NMP | None | — |
| Example 1-2 | PVdF | 3 | PVdF(80)/HFP(20) | 3 | NMP | None | — |
| Example 1-3 | PVdF | 3 | PVdF(85)/CTFE(15) | 3 | NMP | None | — |
| Example 1-4 | PVdF | 3 | PVdF(88)/HFP(6)/CTFE(6) | 3 | NMP | None | — |
| Example 1-5 | PVdF | 5 | PVdF(90)/HFP(10) | 3 | NMP | None | — |
| Example 1-6 | PVdF | 5 | PVdF(90)/HFP(10) | 3 | NMP | None | — |
| Example 1-7 | PVdF | 5 | PVdF(90)/HFP(10) | 3 | NMP | None | — |
| Example 1-8 | PVdF | 5 | PVdF(90)/HFP(10) | 3 | NMP | None | — |
| Example 1-9 | PVdF | 5 | None | — | NMP | None | — |
| Example 1-10 | PVdF | 4 | PVdF(90)/HFP(10) | 3 | Water | None | — |
| Example 1-11 | SBR | 2 | PVdF(90)/HFP(10) | 3 | Water | None | — |
| Comparative Example 1-1 | PVdF | 5 | None | — | NMP | None | — |
| Comparative Example 1-2 | PVdF | 5 | None | — | NMP | None | — |
| Comparative Example 1-3 | PVdF | 6 | PVdF(90)/HFP(10) | 3 | NMP | None | — |

| | Ambient temperature molten salt addition | | Inorganic oxide | | | State of inorganic oxide |
|---|---|---|---|---|---|---|
| | Type | Amount of blending [parts by mass] | Type | Particle size [nm] | Amount of blending [parts by mass] | |
| Example 1-1 | None | — | $Al_2O_3$ | 30 | 2 | ○ |
| Example 1-2 | None | — | $Al_2O_3$ | 30 | 2 | ○ |
| Example 1-3 | None | — | $Al_2O_3$ | 30 | 2 | ○ |
| Example 1-4 | None | — | $Al_2O_3$ | 30 | 2 | ○ |
| Example 1-5 | None | — | $Al_2O_3$ | 30 | 4 | ○ |
| Example 1-6 | None | — | $ZrO_2$ | 50 | 2 | ○ |
| Example 1-7 | None | — | $TiO_2$ | 80 | 2 | ○ |
| Example 1-8 | None | — | $SiO_2$ | 20 | 2 | ○ |
| Example 1-9 | PP13-TFSA | 4 | $Al_2O_3$ | 30 | 2 | ○ |
| Example 1-10 | None | — | $Al_2O_3$ | 30 | 2 | ○ |
| Example 1-11 | None | — | $Al_2O_3$ | 30 | 2 | ○ |
| Comparative Example 1-1 | None | — | None | — | — | X |
| Comparative Example 1-2 | None | — | $Al_2O_3$ | 30 | 2 | X |
| Comparative Example 1-3 | None | — | $Al_2O_3$ | 3000 | 2 | X |

The amount of blending of each material in Table 1 shows the amount of blending (parts by mass) relative to 100 parts by mass of the negative electrode active material (graphite).

From Table 1, the following is found with regard to the negative electrode of Examples 1-1 to 1-11 and Comparative Examples 1-1 to 1-3.

Example 1-1

By blending a PVdF-HFP copolymer as the second binder and $Al_2O_3$ as the inorganic oxide during the fabrication of the negative electrode, a negative electrode active material layer that, after impregnation with the electrolytic liquid, contains $Al_2O_3$ in a state of being extractable with THF or MEK at normal temperature can be obtained.

Example 1-2

Also when the ratio between PVdF and HFP in Example 1-1 is changed, a negative electrode active material layer containing $Al_2O_3$ in a similar state to Example 1-1 can be obtained.

Examples 1-3 and 1-4

Also when a PVdF-CTFE copolymer or a PVdF-HFP-CTFE copolymer is used in place of the PVdF-HFP copolymer as the second binder, a negative electrode active material layer containing $Al_2O_3$ in a similar state to Example 1-1 can be obtained.

Example 1-5

Also when the amount of blended $Al_2O_3$ in Example 1-1 is changed, a negative electrode active material layer containing $Al_2O_3$ in a similar state to Example 1-1 can be obtained.

Examples 1-6 to 1-8

When $ZrO_2$, $TiO_2$, or $SiO_2$ is used in place of $Al_2O_3$ as the inorganic oxide, a negative electrode active material layer that, after impregnation with the electrolytic liquid, contains $ZrO_2$, $TiO_2$, or $SiO_2$ in a state of being extractable with THF or MEK at normal temperature can be obtained.

Example 1-9

Also when the negative electrode active material layer contains an ambient temperature molten salt in place of the second binder, a negative electrode active material layer containing $Al_2O_3$ in a similar state to Example 1-1 can be obtained.

Example 1-10

Also when an aqueous (emulsion-polymerized) PVdF homopolymer and an aqueous (emulsion-polymerized) PVdF-HFP copolymer are used as the first and second binders, respectively, a negative electrode active material layer containing $Al_2O_3$ in a similar state to Example 1-1 can be obtained.

Example 1-11

Also when aqueous SBR and an aqueous (emulsion-polymerized) PVdF-HFP copolymer are used as the first and the second binders, respectively, a negative electrode active material layer containing $Al_2O_3$ in a similar state to Example 1-1 can be obtained.

Comparative Example 1-1

Since the inorganic oxide is not blended and neither the second binder nor the ambient temperature molten salt is blended during the fabrication of the negative electrode, an ordinary negative electrode active material layer not containing the inorganic oxide is obtained.

Comparative Example 1-2

When neither the second binder nor the ambient temperature molten salt is blended during the fabrication of the negative electrode, a negative electrode active material layer that, after impregnation with the electrolytic liquid, contains $Al_2O_3$ in a state of being extractable with THF or MEK at normal temperature cannot be obtained.

Comparative Example 1-3

When the average particle size of the inorganic oxide is more than 1 µm, a negative electrode active material layer that, after impregnation with the electrolytic liquid, contains $Al_2O_3$ in a state of being extractable with THF or MEK at normal temperature cannot be obtained, like in Comparative Example 1-2.

Examples 2-1 to 2-11

As a negative electrode, each of the negative electrodes of Examples 1-1 to 1-11 described above was prepared. Next, a negative electrode lead made of nickel was attached to one end of a negative electrode current collector that each of the negative electrodes has.

A positive electrode was fabricated in the following manner. First, as the positive electrode active material, lithium cobalt composite oxide powder with an average particle size of 13 µm was prepared. Next, 94 mass % of lithium cobalt composite oxide powder and 3 mass % of Ketjenblack as an electrically conductive agent were mixed in a mixed liquid in which 3.0 mass % of PVdF was thoroughly dispersed in NMP; thus, a positive electrode mixture coating material was prepared.

Next, the positive electrode mixture coating material was uniformly applied to both surfaces of a positive electrode current collector made of band-like aluminum foil with a thickness of 20 µm, and drying and pressing were performed to form a positive electrode active material layer on both surfaces of the positive electrode current collector; thus, a positive electrode was obtained. At this time, the thickness of the positive electrode active material layer on one surface of the positive electrode current collector was set to 80 µm. Next, a positive electrode lead made of aluminum was attached to one end of the positive electrode current collector.

Using the positive electrode and the negative electrode obtained in the above manner, a cylindrical secondary battery was fabricated in the following manner. First, the positive electrode and the negative electrode were stacked via a separator made of a fine porous polyethylene stretched film with a thickness of 23 µm in the order of the negative electrode, the separator, the positive electrode, and the separator, and winding was performed multiple times to obtain a jelly-roll wound electrode body. Next, the wound electrode body was sandwiched by a pair of insulating plates, a negative electrode lead was welded to a battery can, a positive electrode lead was welded to a safety valve mechanism, and the wound electrode body was housed in the battery can.

Next, an electrolytic liquid containing a high-permittivity solvent (PC or EC) at 20% or more was introduced into the battery can. Next, a battery lid was fixed by being fastened to the battery can via a gasket. Thus, a cylindrical non-aqueous electrolyte secondary battery was obtained.

Comparative Examples 2-1 to 2-3

A cylindrical non-aqueous electrolyte secondary battery was obtained in the same manner as Examples 2-1 to 2-11 except that each of the negative electrodes of Comparative Examples 1-1 to 1-3 was used.

Evaluation of the Amount of Charging

To evaluate the input characteristics of the cylindrical non-aqueous electrolyte secondary battery of Examples 2-1 to 2-11 and Comparative Examples 2-1 to 2-3 obtained in the above manner, the amount of charging (the charging rate to full charging; the state of charge (SOC)) when charging at a charging rate of 3 C for 20 minutes was performed was evaluated. The charging rate of 3 C is a charging condition whereby the SOC can be 100% in 20 minutes when the overvoltage of the electrode accompanying charging and the resistance of the battery are at a certain level or less; in practice, the SOC after charging of 3 C/20 min is generally well below 100% due to the charging acceptability of the negative electrode and the impedance of the battery. In the Examples, a design in which the impedance of the battery is reduced as low as possible was employed in order to appropriately evaluate the negative electrode.

Table 2 shows the configuration and evaluation result of the negative electrode of the cylindrical non-aqueous electrolyte secondary battery of Examples 2-1 to 2-11 and Comparative Examples 2-1 to 2-3.

TABLE 2

| | Negative electrode | Amount of charging after 3 C./20 min charging (SOC) [%] |
|---|---|---|
| Example 2-1 | Example 1-1 | 76 |
| Example 2-2 | Example 1-2 | 85 |
| Example 2-3 | Example 1-3 | 75 |
| Example 2-4 | Example 1-4 | 82 |
| Example 2-5 | Example 1-5 | 76 |
| Example 2-6 | Example 1-6 | 70 |
| Example 2-7 | Example 1-7 | 75 |
| Example 2-8 | Example 1-8 | 78 |
| Example 2-9 | Example 1-9 | 80 |
| Example 2-10 | Example 1-10 | 74 |
| Example 2-11 | Example 1-11 | 72 |
| Comparative Example 2-1 | Comparative Example 1-1 | 48 |
| Comparative Example 2-2 | Comparative Example 1-2 | 51 |
| Comparative Example 2-3 | Comparative Example 1-3 | 54 |

From Table 2, the following is found.

Examples 2-1 to 2-11

Since the negative electrode active material layer impregnated with the electrolytic liquid contains the inorganic oxide in a state of being extractable with THF or MEK, the input characteristics (specifically, the amount of charging at 3 C/20 min) are improved as compared to Comparative Examples 2-1 to 2-3. The exhibition of this effect is presumably due to the fact that, because of the introduction of the electrolytic liquid, the second binder (a PVdF-HFP copolymer, a PVdF-CTFE copolymer, or a PVdF-HFP-CTFE copolymer) swelled largely or dissolved partly, and part of the inorganic oxide fixed to the second binder was caused to exist in a state of being in sufficient contact with the electrolytic liquid in the negative electrode.

Comparative Example 2-1

Since the negative electrode active material layer does not contain the inorganic oxide, the input characteristics are greatly reduced.

Comparative Example 2-2

Since the negative electrode active material layer contains the inorganic oxide, the reduction in input characteristics tends to be suppressed as compared to the case where the negative electrode active material layer does not contain the inorganic oxide (Comparative Example 2-1). However, since the negative electrode active material layer does not contain the inorganic oxide in the state mentioned above, the reduction in input characteristics is larger than in the case where the negative electrode active material layer contains the inorganic oxide in the state mentioned above (Examples 2-1 to 2-11).

Comparative Example 2-3

When the average particle size of the inorganic oxide is more than 1 µm, the negative electrode active material layer does not contain the inorganic oxide in the state mentioned above, and therefore the input characteristics are greatly reduced like in Comparative Example 2-2.

Hereinabove, embodiments of the present technology and modification examples thereof are specifically described; but the present technology is not limited to the embodiments and the modification examples thereof described above, and various modifications based on the technical idea of the present technology are possible.

For example, the configurations, methods, processes, shapes, materials, numerical values, etc. given in the embodiments and the modification examples thereof described above are only examples, and different configurations, methods, processes, shapes, materials, numerical values, etc. from these may be used as necessary.

The configurations, methods, processes, shapes, materials, numerical values, etc. of the embodiments and the modification examples thereof described above may be combined with each other without departing from the spirit of the present technology.

Although examples in which the present technology is applied to a battery having a wound structure are described in the embodiments and the modification examples thereof described above, the structure of the battery is not limited thereto, and the present technology can be applied also to a battery having a structure in which the positive electrode and the negative electrode are folded, a structure in which they are stacked, etc.

Although examples in which the present technology is applied to a battery having a cylindrical or flat shape are described in the embodiments and the modification examples thereof described above, the shape of the battery is not limited thereto, and the present technology can be applied also to a battery shaped like a coin, button, square, or others.

Although a configuration in which the electrode includes a current collector and an active material layer is described as an example in the embodiments and the modification examples thereof described above, the configuration of the electrode is not limited thereto. For example, a configuration in which the electrode is formed of only an active material layer is possible.

Additionally, the present technology may also be configured as below.

(1) A battery including:
a positive electrode;
a negative electrode; and
an electrolyte, wherein at least one of the positive electrode and the negative electrode is an electrode containing an active material and an inorganic oxide, and
the inorganic oxide is in a state of being extractable with tetrahydrofuran or methyl ethyl ketone at normal temperature.

(2) The battery according to (1), wherein
the electrolyte contains an electrolytic liquid, and
the battery further includes a resin having swellability or solubility to the electrolytic liquid.

(3) The battery according to (2), wherein the resin contains the inorganic oxide.

(4) The battery according to (2) or (3), wherein the resin contains a vinylidene fluoride-based copolymer.

(5) The battery according to (1), further including:
a first resin; and
a second resin,
wherein the first resin contains at least one selected from the group consisting of a homopolymer of vinylidene fluoride, styrene-butadiene copolymer rubber, and poly(acrylic acid), and
the second resin contains a copolymer with at least one selected from the group consisting of vinylidene fluoride, hexafluoropropylene, chlorotrifluoroethylene, and tetrafluoroethylene.

(6) The battery according to (1), further including:
an ambient temperature molten salt; and
a resin.

(7) The battery according to (6), wherein the resin contains the inorganic oxide and the ambient temperature molten salt.

(8) The battery according to (6) or (7), wherein the amount of the ambient temperature molten salt contained is more than or equal to 0.1 parts by mass and less than or equal to 10 parts by mass relative to 100 parts by mass of the active material.

(9) The battery according to any of (6) to (8), wherein the ambient temperature molten salt contains a tertiary or quaternary ammonium salt composed of a tertiary or quaternary ammonium cation and an anion containing a fluorine atom.

(10) The battery according to any of (1) to (9), wherein an average particle size of the inorganic oxide is 1 μm or less.

(11) The battery according to any of (1) to (10), wherein the amount of the inorganic oxide contained is more than or equal to 0.1 parts by mass and less than or equal to 5 parts by mass relative to 100 parts by mass of the active material.

(12) The battery according to any of (1) to (11), wherein the inorganic oxide has a sulfonic acid group or a carboxylic acid group on a surface of the inorganic oxide.

(13) The battery according to any of (1) to (12), wherein the inorganic oxide contains at least one selected from the group consisting of aluminum oxide, hydrated aluminum oxide, titanium oxide, zirconium oxide, silicon oxide, magnesium oxide, sodium oxide, lithium titanate, and hydrous magnesium silicate.

(14) The battery according to any of (1) to (13), wherein the inorganic oxide is contained in a larger amount in the electrode than between the positive electrode and the negative electrode.

(15) The battery according to any of (1) to (14), wherein the negative electrode contains the inorganic oxide.

(16) The battery according to any of (1) to (15), wherein
the electrolyte contains an electrolytic liquid, and
the electrode is impregnated with the electrolytic liquid.

(17) An electrode including:
an active material; and
an inorganic oxide,
wherein the inorganic oxide is in a state of being extractable with tetrahydrofuran or methyl ethyl ketone at normal temperature after impregnation with an electrolytic liquid.

(18) The electrode according to any one of (6) to (9), wherein
the resin is in a state of being composited with the ambient temperature molten salt, and
the resin in a composited state contains the inorganic oxide.

(19) The battery according to any one of (1) to (18), wherein the electrolyte is an electrolytic liquid or a gel electrolyte.

(20) A battery pack including the battery according to any one of (1) to (19).

(21) An electronic device including the battery according to any one of (1) to (19).

(22) An electric vehicle including the battery according to any one of (1) to (19).

(23) An electricity storage device including the battery according to any one of (1) to (19).

(24) An electric power system including the battery according to any one of (1) to (19).

Furthermore, the present technology may also be configured as below.

(25) An electrode including:
an active material, an inorganic oxide; and
a vinylidene fluoride-based copolymer,
wherein the vinylidene fluoride-based copolymer contains an inorganic oxide.

(26) An electrode including:
an active material, an inorganic oxide, an ambient temperature molten salt; and
a resin,
wherein the resin contains the inorganic oxide and the ambient temperature molten salt.

(27) The electrode according to (26), wherein
the resin is in a state of being composited with the ambient temperature molten salt, and
the resin in a composited state contains the inorganic oxide.

(28) A battery including:
a positive electrode, a negative electrode; and
an electrolyte,
wherein at least one of the positive electrode and the negative electrode is an electrode containing an active material, an inorganic oxide, and a vinylidene fluoride-based copolymer, and
the vinylidene fluoride-based copolymer contains an inorganic oxide.

(29) A battery including:
a positive electrode;
a negative electrode; and
an electrolyte,
wherein at least one of the positive electrode and the negative electrode contains an active material, an inorganic oxide, an ambient temperature molten salt, and a resin, and
the resin contains the inorganic oxide and the ambient temperature molten salt.

REFERENCE SIGNS LIST 11 battery can
12, 13 insulating plate
14 battery lid
15 safety valve mechanism
15A disc plate
16 thermosensitive resistance element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead

The invention claimed is:

1. A battery, comprising:
a positive electrode;
a negative electrode; and
an electrolyte,
wherein at least one of the positive electrode or the negative electrode comprises an active material layer,
wherein the active material layer comprises a mixture of a first resin, a second resin, an active material, and an inorganic oxide,
wherein the inorganic oxide is in a state of being extractable with one of tetrahydrofuran or methyl ethyl ketone at a normal temperature,
wherein the first resin contains at least one selected from the group consisting of a homopolymer of vinylidene fluoride, styrene-butadiene copolymer rubber, and poly(acrylic acid),
wherein the second resin contains a copolymer with at least one selected from the group consisting of a poly(vinylidene fluoride)-hexafluoropropylene (PVdF-HFP) copolymer, a poly(vinylidene fluoride)-chlorotrifluoroethylene (PVdF-CTFE) copolymer, a poly(vinylidene fluoride)-tetrafluoroethylene (PVdF-TFE) copolymer, a PVdF-HFP-CTFE copolymer, a PVdF-HFP-TFE copolymer, a PVdF-CTFE-TFE copolymer, and a PVdF-HFP-CTFE-TFE copolymer, and
wherein an average particle size of the inorganic oxide is smaller than a pore size of the active material layer.

2. The battery according to claim 1,
wherein the electrolyte contains an electrolytic liquid, and wherein the first resin one of swells or dissolves in the electrolytic liquid.

3. The battery according to claim 2, wherein the second resin contains the inorganic oxide.

4. The battery according to claim 1, further comprising an ambient temperature molten salt.

5. The battery according to claim 4, wherein the first resin contains the inorganic oxide and the ambient temperature molten salt.

6. The battery according to claim 4, wherein an amount of the ambient temperature molten salt contained in the first resin is more than or equal to 0.1 parts by mass of the active material and less than or equal to 10 parts by mass of the active material relative to 100 parts by mass of the active material.

7. The battery according to claim 4, wherein the ambient temperature molten salt contains one of a tertiary or quaternary ammonium salt composed of one of a tertiary or quaternary ammonium cation, respectively, and an anion containing a fluorine atom.

8. The battery according to claim 1, wherein the average particle size of the inorganic oxide is 1 μm or less.

9. The battery according to claim 1, wherein an amount of the inorganic oxide in the active material layer is more than or equal to 0.1 parts by mass of the active material and less than or equal to 5 parts by mass of the active material relative to 100 parts by mass of the active material.

10. The battery according to claim 1, wherein the inorganic oxide has one of a sulfonic acid group or a carboxylic acid group on a surface of the inorganic oxide.

11. The battery according to claim 1, wherein the inorganic oxide contains at least one selected from the group consisting of aluminum oxide, hydrated aluminum oxide, titanium oxide, zirconium oxide, silicon oxide, magnesium oxide, sodium oxide, lithium titanate, and hydrous magnesium silicate.

12. The battery according to claim 1, wherein a first amount of the inorganic oxide present inside at least one of the positive electrode or the negative electrode is larger than a second amount of the inorganic oxide present between the positive electrode and the negative electrode.

13. The battery according to claim 1, wherein the negative electrode contains the inorganic oxide.

14. The battery according to claim 1, wherein the electrolyte contains an electrolytic liquid, and at least one of the negative electrode or the positive electrode is impregnated with the electrolytic liquid.

15. An electrode, comprising:
an active material layer comprising a mixture of a first resin, a second resin, an active material, and an inorganic oxide,
wherein the inorganic oxide is in a state of being extractable with one of tetrahydrofuran or methyl ethyl ketone at a normal temperature after impregnation with an electrolytic liquid,
wherein the first resin contains at least one selected from the group consisting of a homopolymer of vinylidene fluoride, styrene-butadiene copolymer rubber, and poly(acrylic acid),
wherein the second resin contains a copolymer with at least one selected from the group consisting of a poly(vinylidene fluoride)-hexafluoropropylene (PVdF-HFP) copolymer, a poly(vinylidene fluoride)-chlorotrifluoroethylene (PVdF-CTFE) copolymer, a poly(vinylidene fluoride)-tetrafluoroethylene (PVdF-TFE) copolymer, a PVdF—HFP-CTFE copolymer, a PVdF-HFP-TFE copolymer, a PVdF-CTFE-TFE copolymer, and a PVdF—HFP-CTFE-TFE copolymer, and wherein an average particle size of the inorganic oxide is smaller than a pore size of the active material layer.

\* \* \* \* \*